(12) United States Patent
Rosenquist

(10) Patent No.: US 6,977,505 B1
(45) Date of Patent: Dec. 20, 2005

(54) METHOD FOR LOCATING UNDERGROUND FLUID SOURCES

(76) Inventor: Lanny Rosenquist, 3133 Madison Ave., Fort Dodge, IA (US) 50501

(*) Notice: Subject to any disclaimer, the term of this patent is extended or adjusted under 35 U.S.C. 154(b) by 102 days.

(21) Appl. No.: 10/237,347

(22) Filed: Sep. 9, 2002

(51) Int. Cl.$^7$ .......................... G01V 3/08; G01N 15/08
(52) U.S. Cl. ...................... 324/345; 702/12
(58) Field of Search ............... 702/5, 12, 13; 324/345, 260, 261, 262

(56) References Cited

U.S. PATENT DOCUMENTS

| | | | |
|---|---|---|---|
| 3,836,841 A | | 9/1974 | Morrison |
| 4,165,480 A | | 8/1979 | Morrison |
| 4,254,831 A | | 3/1981 | Nuzman |
| 4,427,943 A | | 1/1984 | Cloutier et al. |
| 4,639,675 A | | 1/1987 | Hinton |
| 4,727,329 A | * | 2/1988 | Behr .......................... 324/345 |
| 4,837,514 A | | 6/1989 | Spies |
| 5,134,369 A | * | 7/1992 | Lo et al. ..................... 324/245 |
| 5,189,909 A | | 3/1993 | Oike et al. |
| 5,610,523 A | | 3/1997 | Elliott |
| 5,629,626 A | * | 5/1997 | Russell et al. .............. 324/345 |
| 5,767,680 A | * | 6/1998 | Torres-Verdin et al. ..... 324/355 |
| 5,825,188 A | | 10/1998 | Montgomery et al. |
| 6,150,812 A | * | 11/2000 | Pinsky et al. ................ 324/261 |
| 6,244,534 B1 | | 6/2001 | Klinkert |
| 6,255,825 B1 | * | 7/2001 | Seigel et al. ................. 324/331 |
| 6,332,109 B1 | | 12/2001 | Sheard et al. |
| 6,586,937 B2 | * | 7/2003 | Goodman .................... 324/326 |
| 6,622,093 B1 | * | 9/2003 | Fujinawa et al. ............. 702/15 |

OTHER PUBLICATIONS

"Applied Geophysics for Geologists and Engineers" Griffiths & King, Magnet Surveying pp. 178-183.
Applications Manual for Portable Magnetometers, S. Breiner, 1973 GeoMetrics pp. 51-54.

* cited by examiner

Primary Examiner—Bot Ledynh
Assistant Examiner—Reena Aurora
(74) Attorney, Agent, or Firm—McKee, Voorhees & Sease, P.L.C.

(57) ABSTRACT

The present invention discloses a method for finding and analyzing underground magnetic anomalies. The method includes measuring magnetic signatures of the magnetic anomalies, interpreting the magnetic signatures to determine that the magnetic signatures are magnetic signatures of an underground fluid source, and determining at least one characteristic of the underground fluid source from the magnetic signatures.

14 Claims, 45 Drawing Sheets

METHOD FOR LOCATING UNDERGROUND FLUID SOURCES

BACKGROUND OF THE INVENTION

The present invention is a method of locating underground fluid sources. More particularly, but without limitation, the present invention provides a method of locating an aquifer based on magnetic signatures associated with the aquifer. The methodology of the present invention is believed to be applicable to other fluid sources, including oil.

There has long been great interest in finding underground sources of water. Typically, one locates water by drilling test holes until sufficient water is located. This ad hoc method can be both time consuming and costly. Moreover, even if water is found, the quantity of the water well may not be sufficient. For example, had the well been drilled elsewhere, a shallower hole could have been drilled, or more water would have been available. Thus, problems remain.

Other attempts have used magnetometers and mapping. Such attempts have focused on using magnetometers to determine the presence or absence of particular geological formations or structures. The formations can include fractures in bedrock or beds of porous materials or other structures that can potentially contain water. The problem with this approach is that although particular geological formations may have the ability to contain a particular fluid such as petroleum, ground water, or natural gas, there is no guarantee that the desired fluid associated with a particular geological formation will be present. What is needed is a more direct method of locating an underground fluid source that is accurate.

Therefore, it is a primary, object, feature, or advantage of the present invention to improve upon the state of the art.

Another object, feature, or advantage of the present invention is to provide a method for locating underground fluids including water.

Yet another object, feature, or advantage of the present invention is to provide a method for locating underground fluids using magnetic signatures associated with the underground fluids and not merely a geological formation.

A further object, feature, or advantage of the present invention is to provide a method for locating underground fluids that allows underground fluid sources to be precisely located.

A still further object, feature, or advantage of the present invention is to provide a method for locating underground fluids that allows the size of underground fluid sources to be determined.

A still further object, feature, or advantage of the present invention is to provide a method for locating underground fluids such that a preferred location to drill can be determined.

Yet another object, feature or advantage of the present invention is to provide a method capable of detecting not just shallow aquifers but also deep sources.

These and/or other objects, features, or advantages of the present invention will become apparent from the specification and claims that follow.

SUMMARY OF THE INVENTION

The present invention provides a method for finding and analyzing naturally occurring magnetic anomalies that emanate from underground sources. The inventor has discovered that most aquifers have an associated magnetic field. This associated magnetic field is independent of any magnetic field created by a particular geological formation. Based on this discovery, the present invention provides for directly determining characteristics of an aquifer. This provides distinct advantages over prior art methods of indirectly attempting to locate underground fluid sources through geological formations.

Once magnetic anomalies are found, their magnetic signatures are determined through use of a magnetometer. The magnetic signatures can then be mapped to determine if the magnetic signatures are magnetic signatures of an underground fluid source. Once an underground fluid source is located in this manner, additional characteristics of the underground fluid source are determined. These characteristics can include the location of the underground fluid source, the location of an optimized drilling point to access the underground fluid source, the capacity of the underground fluid source or other characteristics associated with the underground fluid source.

DETAILED DESCRIPTION OF THE INVENTION

The present invention provides for locating underground fluid sources based on magnetic signatures. The present inventor has discovered that most aquifers have an associated magnetic field. It is believed that this effect is due to the composition and permeable space of the water bearing formation. Many sands, gravels, and sandstones have iron-bearing and magnetic minerals that comprise a certain percentage of their total composition. Magnetic fields have also been detected from fractures in limestone and basalt. When a fluid such as water is introduced into a porous medium with magnetic minerals, the minerals are allowed to rotate and align themselves with the earth's natural magnetic field. If enough magnetic grains are allowed to align with the earth's field, then a magnetic anomaly will be generated and, depending on its characteristics, will be able to be detected from the surface of the ground. If the formation is void of magnetic minerals, has low porosity and/or it is dry, then magnetic grains, if present, will not be able to align with the natural field.

The present invention relies upon this discovery to provide for identifying the presence of fluid sources. Because the magnetic grains do not align to the natural field when a formation is dry, the present invention is accurate in detecting the presence of fluid supplies. This allows the present invention to be more accurate and efficient than prior art methodology that relies upon the presence of particular geological formations that may or may not contain fluid sources. Accuracy is of extreme importance due to the time and cost constraints of drilling for fluid.

Figure 1:
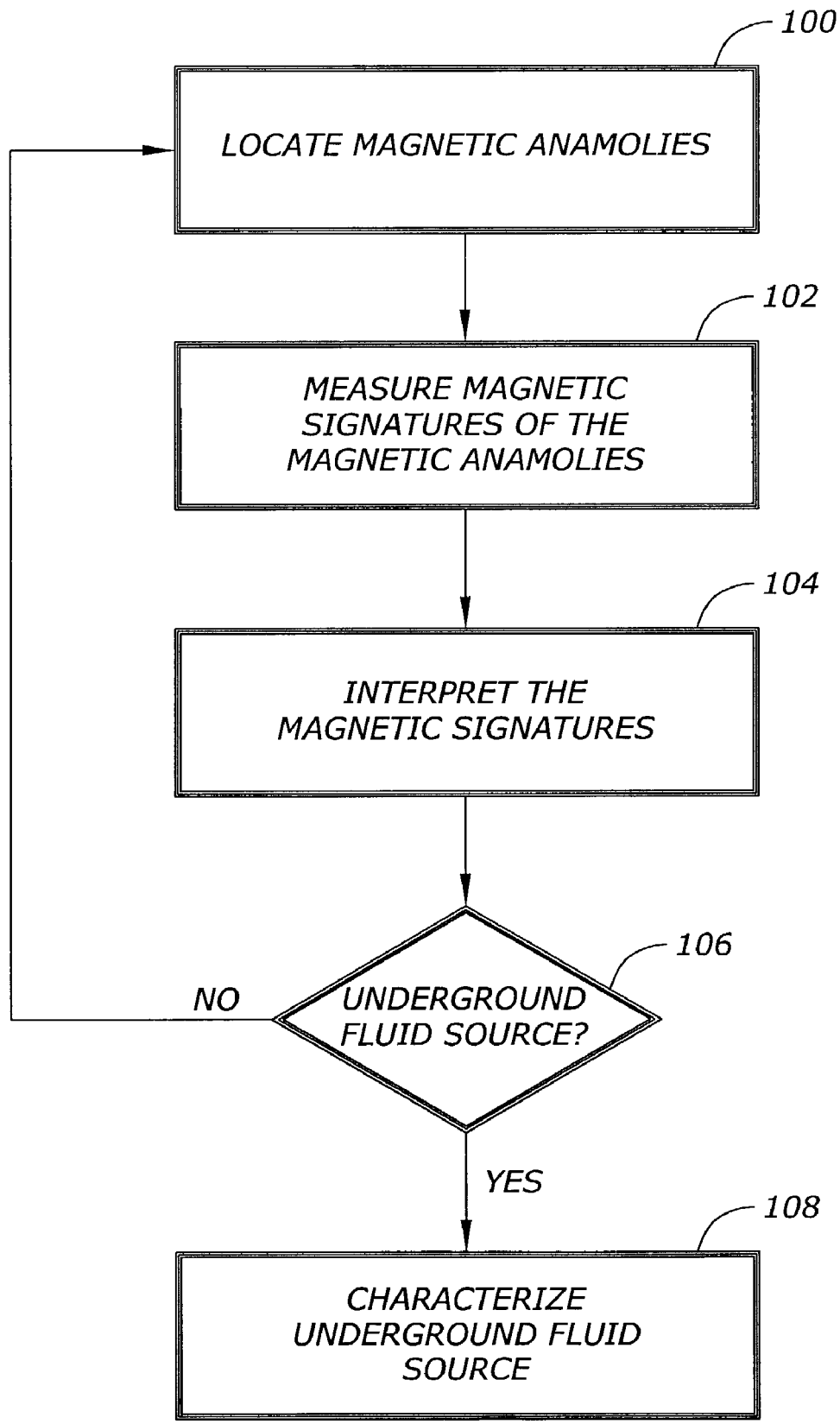
FIG. 1 is a flow diagram of one embodiment of a method of the present invention.

FIG. 1 provides an overview of the one embodiment of the present invention. In step 102, magnetic anomalies are located. Once a magnetic anomaly is located, in step 102, magnetic signatures of the magnetic anomalies are measured. In step 104, the magnetic signatures are interpreted. Then in step 106, based on the interpretation of step 104, a determination is made as to whether the magnetic signatures indicate the presence or absences of an underground fluid source. If there is no underground fluid source, then in step 100, additional magnetic anomalies can be identified. If an underground fluid source is present, then in step 108, the underground fluid source can be characterized and the determination can be made as to whether drilling is desirable, and if so, a preferred drilling site can be determined.

The present invention contemplates that in order to improve efficiency, instead of determining magnetic signatures for a large area which may or may not contain one or more magnetic anomalies, first, magnetic anomalies can be identified and then only magnetic signatures associated with these magnetic anomalies need to be obtained.

The present invention contemplates that magnetic anomalies can be detected in various ways and is not limited to any particular method. In small areas, magnetic anomalies and resulting magnetic signatures can be detected by walking with a magnetometer.

The present invention provides for measuring the total magnetic field with the magnetometer instead of only a horizontal or vertical component of the magnetic field.

Figure 2:
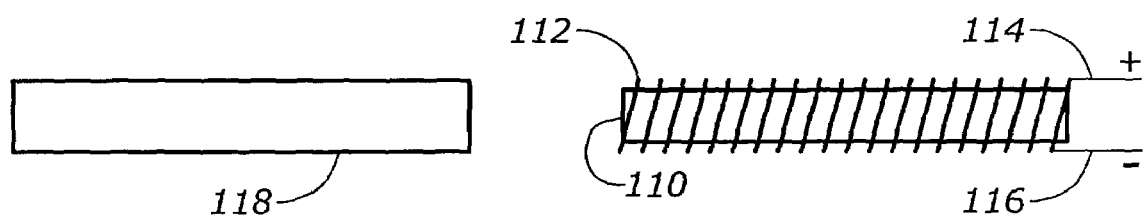
FIG. 2 is diagram of a rod for use in determining the presence of magnetic anomalies.

For larger areas, one device that can be used is disclosed herein. This device and/or component parts thereof are shown in FIGS. 2–5. An aluminum trailer houses two iron-nickel rods (sometimes called supermalloy) within its frame. FIG. 2 illustrates a rod 110. Each rod 110 is 1 inch in diameter and 10 inches in length. Each rod 110 is wrapped 5200 times with #25 magnetic wire 112. The rods 110 are then housed in a 1¼ inch diameter and 12 inch long aluminum pipe 118 with resin poured into the ends of the pipe 118.

Figure 3:
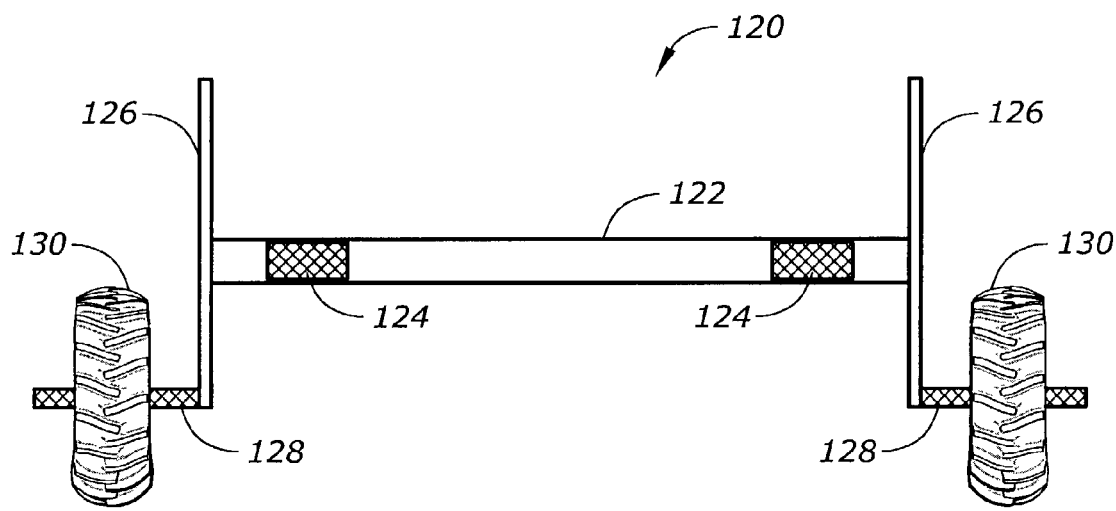
FIG. 3 is a rear view of a trailer adapted for determining the presence of magnetic anomalies.
Figure 4:
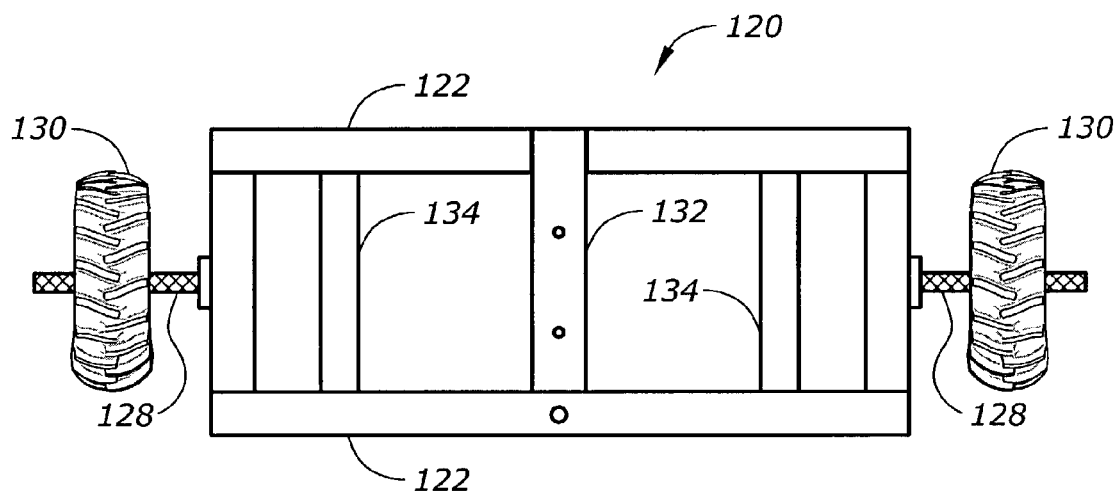
FIG. 4 is a top view of the trailer adapted for determining the presence of magnetic anomalies.

The trailer 120 is shown in FIGS. 3 and 4. FIG. 3 illustrates an end view of the trailer 120. The trailer 120 includes wheels or tires 130 on axles 128. The axles can each be a 1 9/16 inch solid round aluminum piece. The axles 128 are operatively connected to frame end members 126 that are also solid aluminum. Between the frame end members 126 are traverse frame members 122. The traverse frame members 122 include access panels 124. The frame end members 126 preferably provide for height adjustment of the attached traverse frame members. The traverse frame members 122 can be of 3 inch square aluminum. As shown in FIG. 4, a longitudinal frame member 132 across the traverse frame members 122 is shown. The longitudinal frame member 132 can be a 4 inch by 16 inch square piece of aluminum. In addition, the trailer 120 can include a tongue and hitch (not shown).

Figure 5:
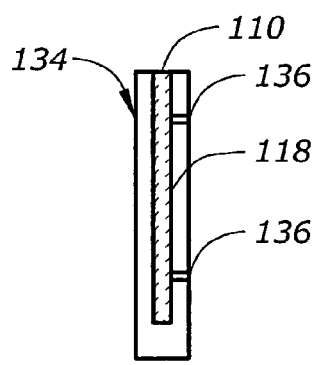
FIG. 5 is a diagram of a rod holder of the trailer adapted for determining the presence of magnetic anomalies.

The rod holders 134 are also shown running parallel to the ground and operatively connected to the traverse frame members 122. The rod holders 134 are best shown in FIG. 5. Each rod holder 134 is a solid aluminum square about 13 inches in length that has a 1½ inch hole drilled in it. The rods 110 housed in the aluminum pipe 118 are inserted horizontally into the rod holders 134. After the pipes 118 are inserted, setscrews 136 can be used to hold the rods 110 in place.

At one end of the rods 110, the wires are connected to an electrical connection that allows the wires to run through the trailer 120. The coils formed by the wound wire 112 wrapped around the rods 110 are wired in opposition to each other so when they encounter a large enough difference in the magnetic field between the rods 110, the voltage from one coil will be greater than the other. The wire that connects the rods to each other is then run to a voltmeter with a sensitivity of 1 microvolt. This is sufficient sensitivity for anomalies as small as 30 gamma to be detected but still allows the voltmeter to be zeroed when there is little magnetic activity unless changing directions abruptly or rough terrain is encountered. The wire connectors that lead to the voltmeter are then plugged into the end of the rod 110. The height of the rods 110, in the trailer, is preferably within 18 inches of the surface of the ground because of the higher magnitude of the anomalies at that height. The height of the rods is directly related to the sensitivity of the instrument. The trailer 120 is usually pulled by an ATV and the voltmeter is mounted in front of the driver so that the driver can see the voltmeter at all times while driving. This configuration is merely one that can be used according to the present invention. The present invention contemplates variations in the type of vehicle, length of rods, number of coil turns, height of the rods, and other variations as would be appropriate in different applications. This aspect of the invention merely provides one convenient method of determining the presence of anomalies.

Most of the time the voltmeter should be on zero, unless an anomaly is encountered such that the voltmeter produces a reading. The reading on the voltmeter does not directly correspond to the magnitude of the magnetic anomaly. The voltmeter only identifies where the magnetic anomalies are and is not intended to give an accurate reading. After a reading on the voltmeter appears, the location should be flagged along with any other anomalies. After the area has been completely covered, using this technique, a general pattern of the magnetic signature may become noticeable.

By first flagging magnetic anomalies in this manner, only reduced areas needs to be further examined with a magnetometer to detect magnetic signatures associated with the magnetic anomalies. The locations, that are marked, can then be read with a magnetometer to see which anomaly is the highest and what its relationship, magnitude and direction, is with the other anomalies. This information provides an indication of where and how much of an area to further examine and to map. The present invention does not require that magnetic anomalies first be located, instead, for any size of area a magnetometer can be used for mapping. First locating magnetic anomalies, however, reduces the amount of time and effort required for obtaining the necessary measurements for mapping and is therefore generally preferred.

The magnetometer used is preferably an Overhauser magnetometer although the present invention contemplates that other types of magnetometers can be used. The height at which the sensor of the magnetometer should be placed should be high enough so that magnetic irregularities in the soil will not be picked up, or if they are, then their magnitude is kept to a minimum. When using a magnetometer in a 'walk mode' it is usually best to place the sensor at shoulder height. This is high enough so that most of the magnetic disturbances from the soil will be eliminated; in addition, it will be stable and close to the body when rough or wooded terrain is encountered. The magnetometer is then used to take the appropriate measurements that can then be transferred to a computer and mapped.

Figure 6A:
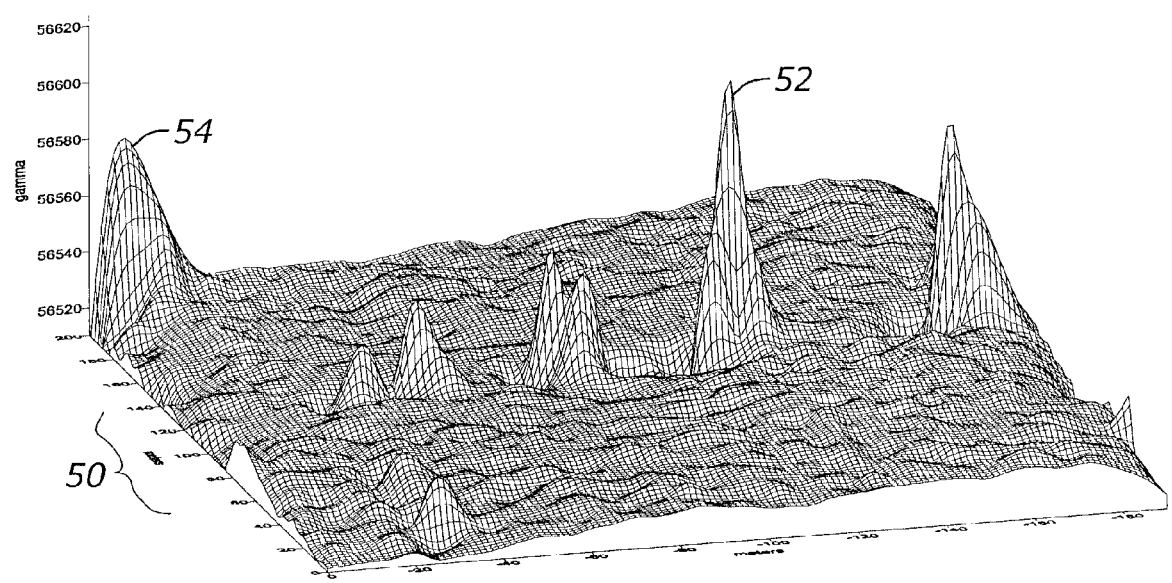
FIG. 6A is a three dimensional map of an area showing a horizontal, narrow buried channel magnetic signature.
Figure 6B:
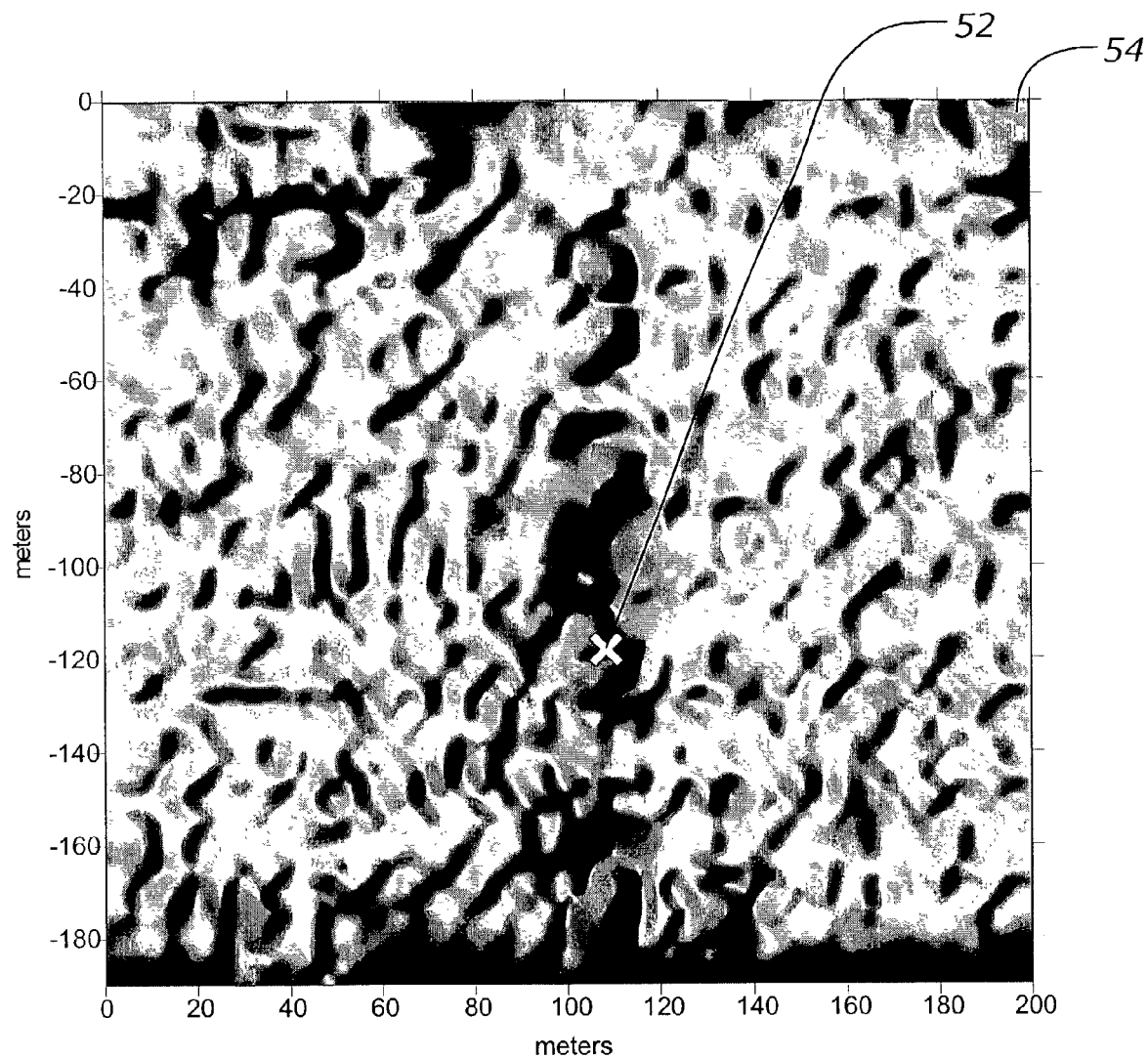
FIG. 6B is a shaded relief map corresponding to FIG. 6A.
Figure 6C:
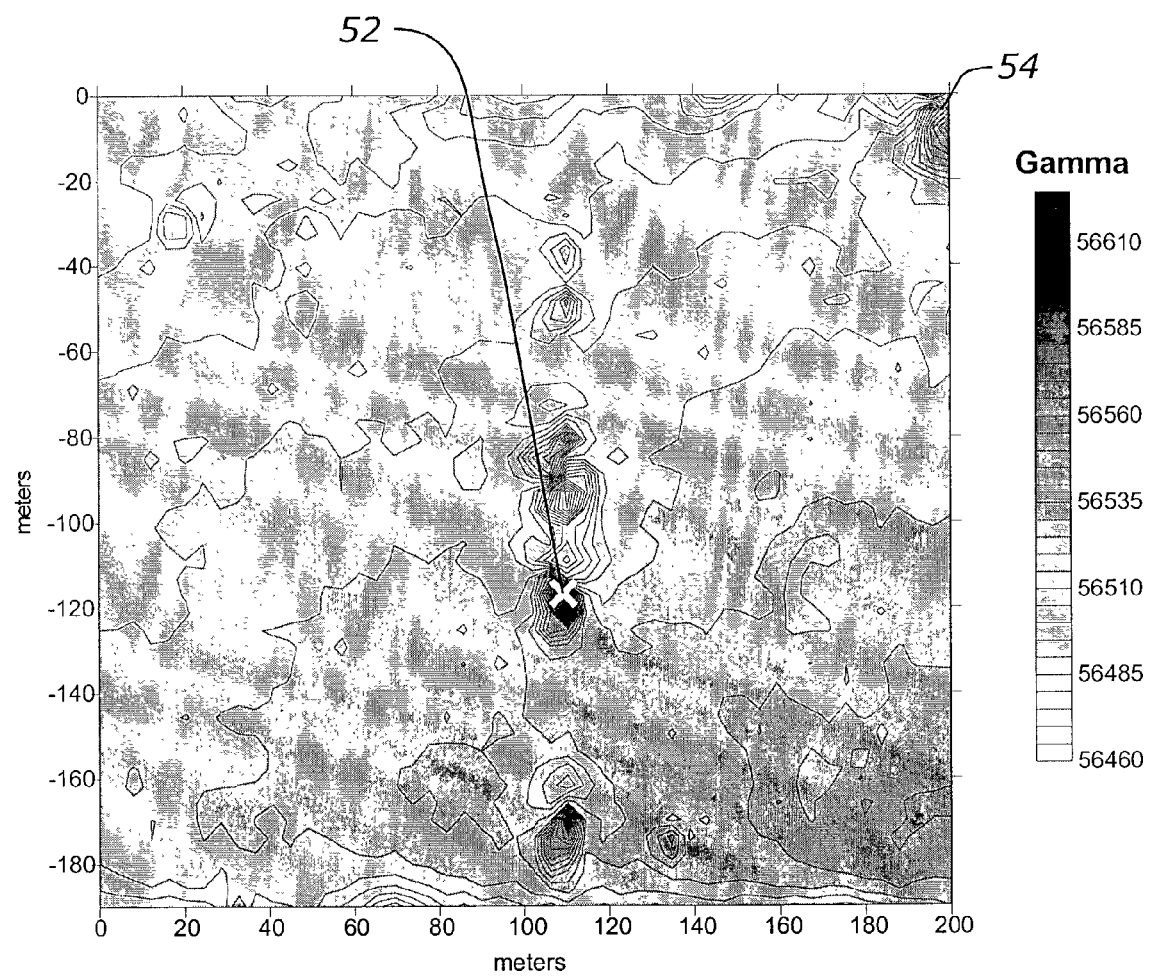
FIG. 6C is a contour map corresponding to FIG. 6A.

The typical maps of the magnetic signatures that are produced from the magnetometer data can include three-dimensional maps, contour maps, and shaded relief maps. FIG. 6A provides a three-dimensional map. FIG. 6B provides an example of a contour map and FIG. 6C provides an example of a shaded relief map for the same area. Preferably all three types of maps are used in conjunction with each other, however, for demonstration purposes. The present invention contemplates that other types of maps can also be used for visualization purposes. The maps can be created using Surfer from Golden Software, Inc. or other suitable software applications. Instead of using maps, the present invention contemplates that the raw data of the reading can be interpreted by a person or by computer or other electronic device and software if applicable. Magnetic signatures that are associated with aquifers vary in shape, area, magnitude, density, etc., therefore different types of mapping techniques may be used to understand these signatures. Once a magnetic anomaly has been located, its relationship to other anomalies, if any, is important as to what area to map. Generally a map that would be centered on the most prominent magnetic anomaly and cover 150–200 meters in all directions from the highest anomaly would give a good indication as to the size, shape and inclination of the magnetic signature. Of course, this can vary with the area being examined.

Additional maps may be required to be added to the parameters of the original map to give a better idea as to where the magnetic source is located. The density of data points can be important in locating all of the needed information. Usually, when mapping, a grid pattern of 2–5 meter spacing would be sufficient. Only in situations where the magnetic signature covers large areas, as in large regional aquifers, would it be feasible to lower the data density. However, due to the confined area that some narrow buried channels are, it is best not to exceed the 5-meter density.

The present invention provides for the magnetic signatures to then be analyzed based on the magnetometer readings. According to one embodiment of the present invention, maps are created and analyzed, although the present invention contemplates that the data collected could be otherwise analyzed. The maps can be created with geophysical mapping software. The magnitude, shape, inclination, depth and other characteristics of these magnetic anomalies are dependent on the amount of magnetic minerals that are aligned to the earth's natural magnetic field, the extent and angle of the area in the formation, and the depth of the formation, and other variations associated with the underground fluid source.

The basic underground fluid sources of interest are narrow channel deposits, wide channel deposits, and regional aquifers. To aid in discussion of the step of interpretation of the magnetic anomalies associated with these fluid sources, representative figures of magnetic signatures are shown. These representative figures were taken in the mid-latitudinal region of 40–45 degrees north in the United States. The present invention provides that contour maps and shaded relief maps can also be used where appropriate as exemplified in FIGS. 6B and 6C corresponding to the three-dimensional map of FIG. 6A.

The first type of underground fluid source is a narrow channel deposit. A narrow channel deposit is generally much longer down the axis than its width. A narrow channel deposit will typically display two different types of magnetic signatures depending on how the affected formation is magnetized. In the first type of magnetic signature, the formation is magnetized close to the inclination of the earth's natural field. This type of magnetic signature can be considered a horizontal narrow channel deposit. A representative narrow channel deposit is shown in FIGS. 6A–6C. In such a channel deposit, the magnetic signature will tend to form a row 50 of magnetic peaks and valleys that are usually isolated only to the row 50. The surrounding area that is not within the row 50 will remain unaltered by any magnetic anomalies. Usually, the anomaly with the greatest magnitude will be at the center 52 of the magnetic source with succeeding anomalies generally decreasing in intensity down the axis of the row until eventually there are no visible anomalies that are associated with the aquifer. Also, as the distance from the center increases, the positive anomalies will split forming clusters of peaks, or multiple apexes, before returning to the natural field. Usually the apexes within the cluster will generally increase in distance from each other and may accumulate additional apexes, in each cluster as distance increases from the center.

Figure 7:
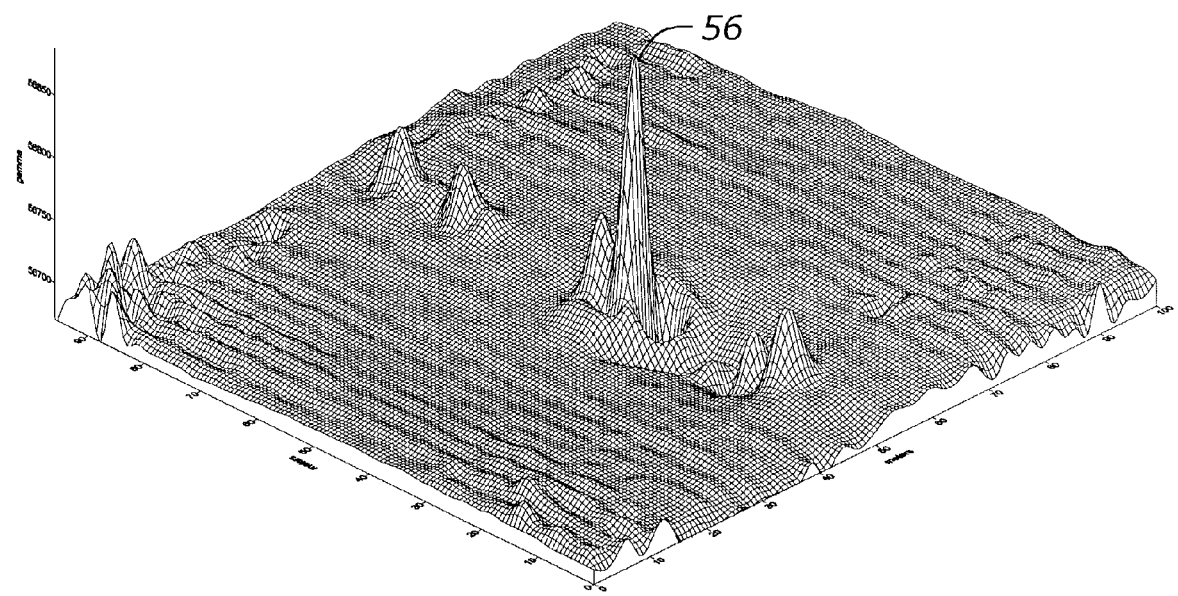
FIG. 7 is a three dimensional map of an area showing a horizontal, narrow buried channel magnetic signature.
Figure 7B:
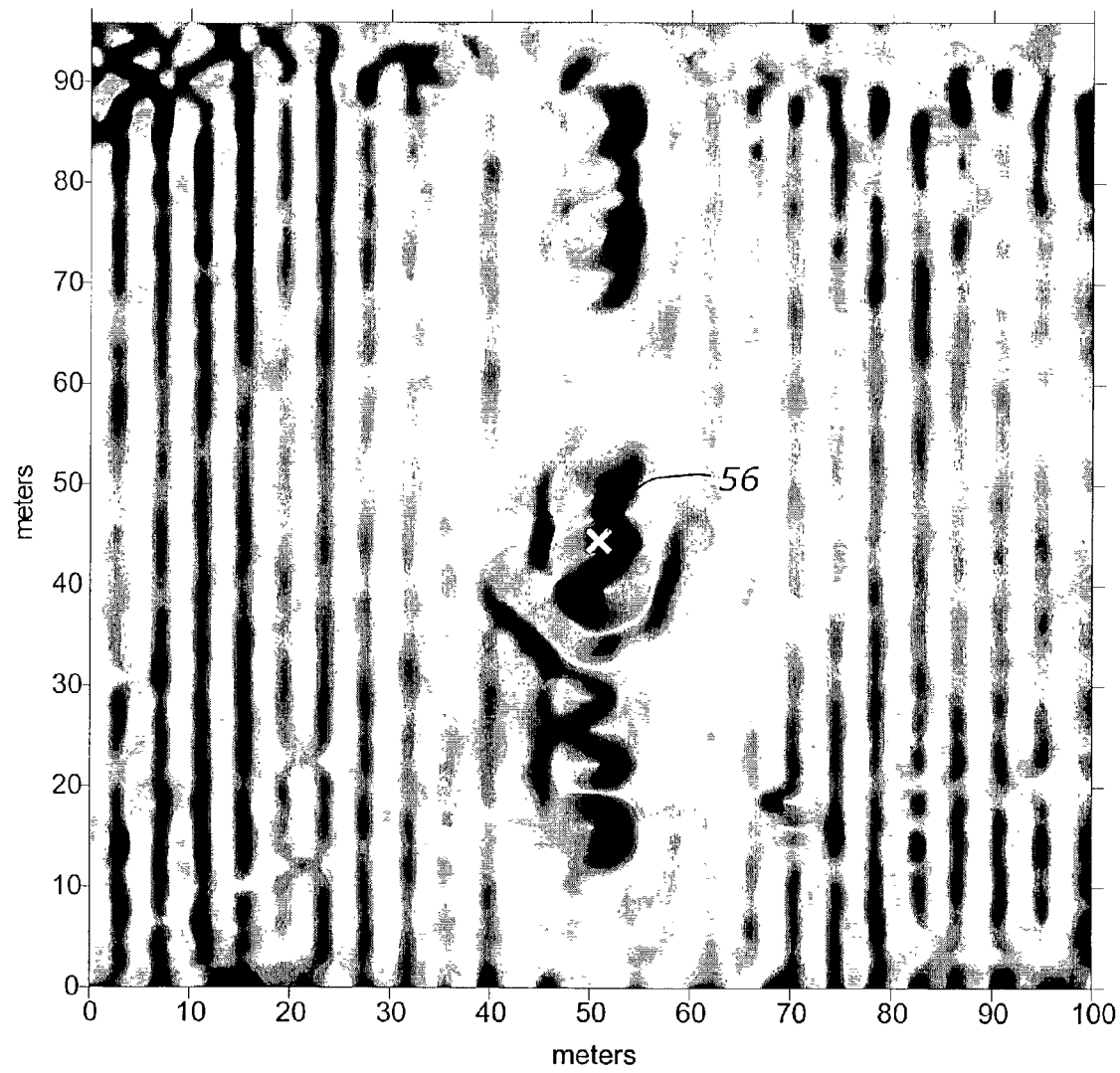
FIG. 7B is a shaded relief map corresponding to FIG. 7.
Figure 7C:
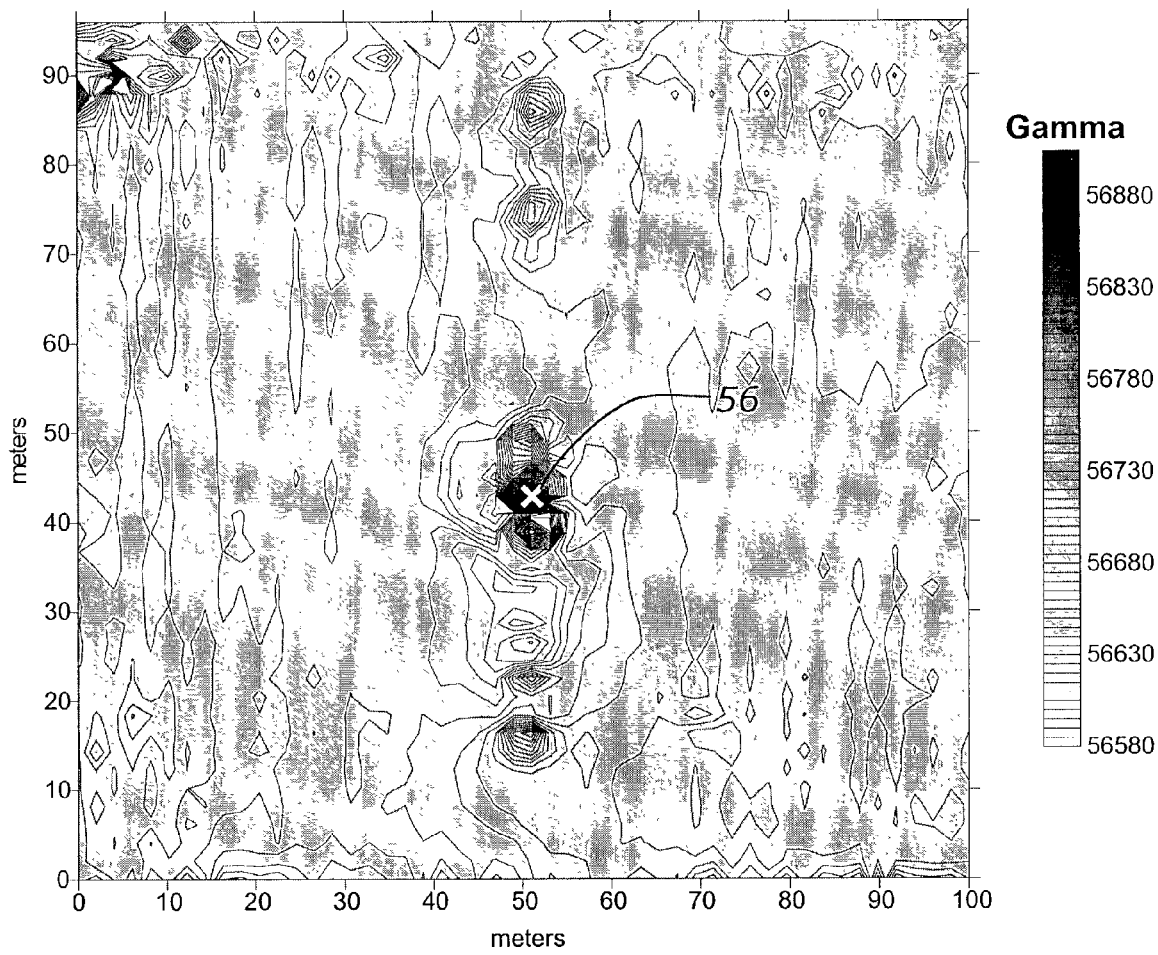
FIG. 7C is a contour map corresponding to FIG. 7.

The magnetic signature in a buried channel environment varies considerably with the inclination of the axis in the magnetic source. As shown in FIGS. 7, 7B and 7C, when the axis is horizontal, or nearly horizontal, a row of anomalies extends outward on both sides of the center peak 56. However, once the source is tilted down the axis to a certain degree, one side of the row is no longer detectable at the surface and only one side remains. In such case, the peak with the highest magnitude appears at the end of the row instead of the center of the row as shown by the center peak 58 of FIG. 8.

Figure 8:
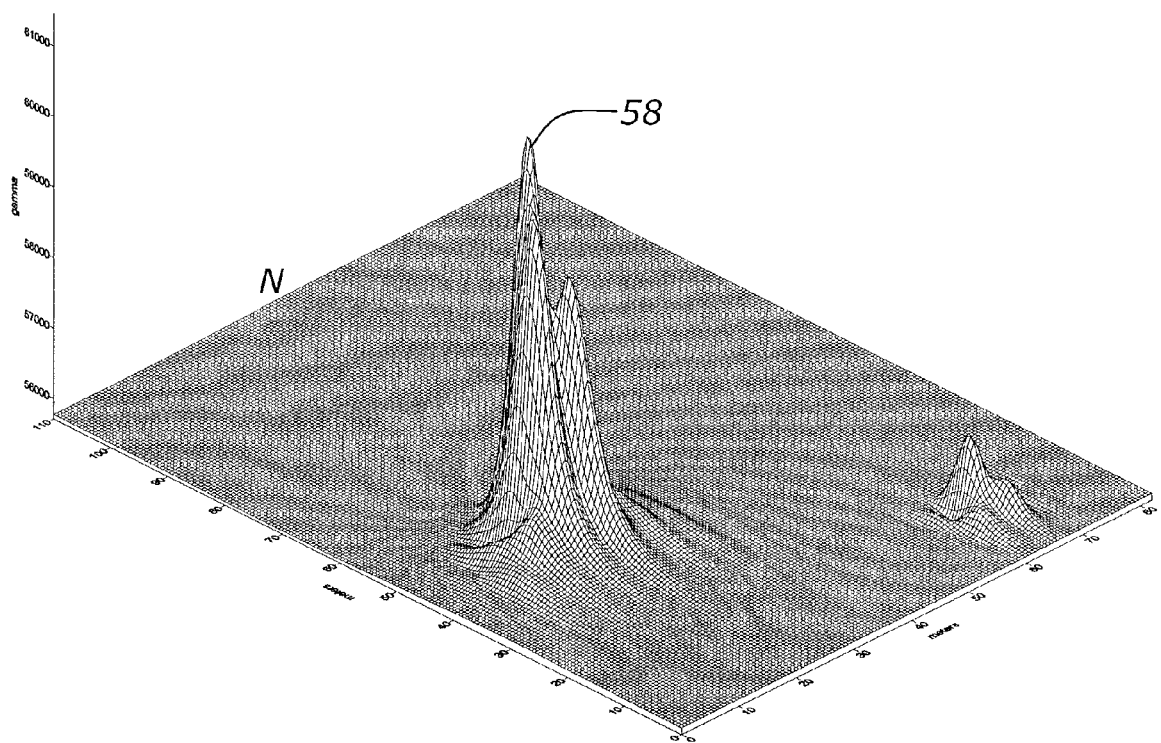
FIG. 8 is a three dimensional map of a magnetic signature associated with a narrow buried channel where the source is dipping to the northwest along its axis.
Figure 8B:
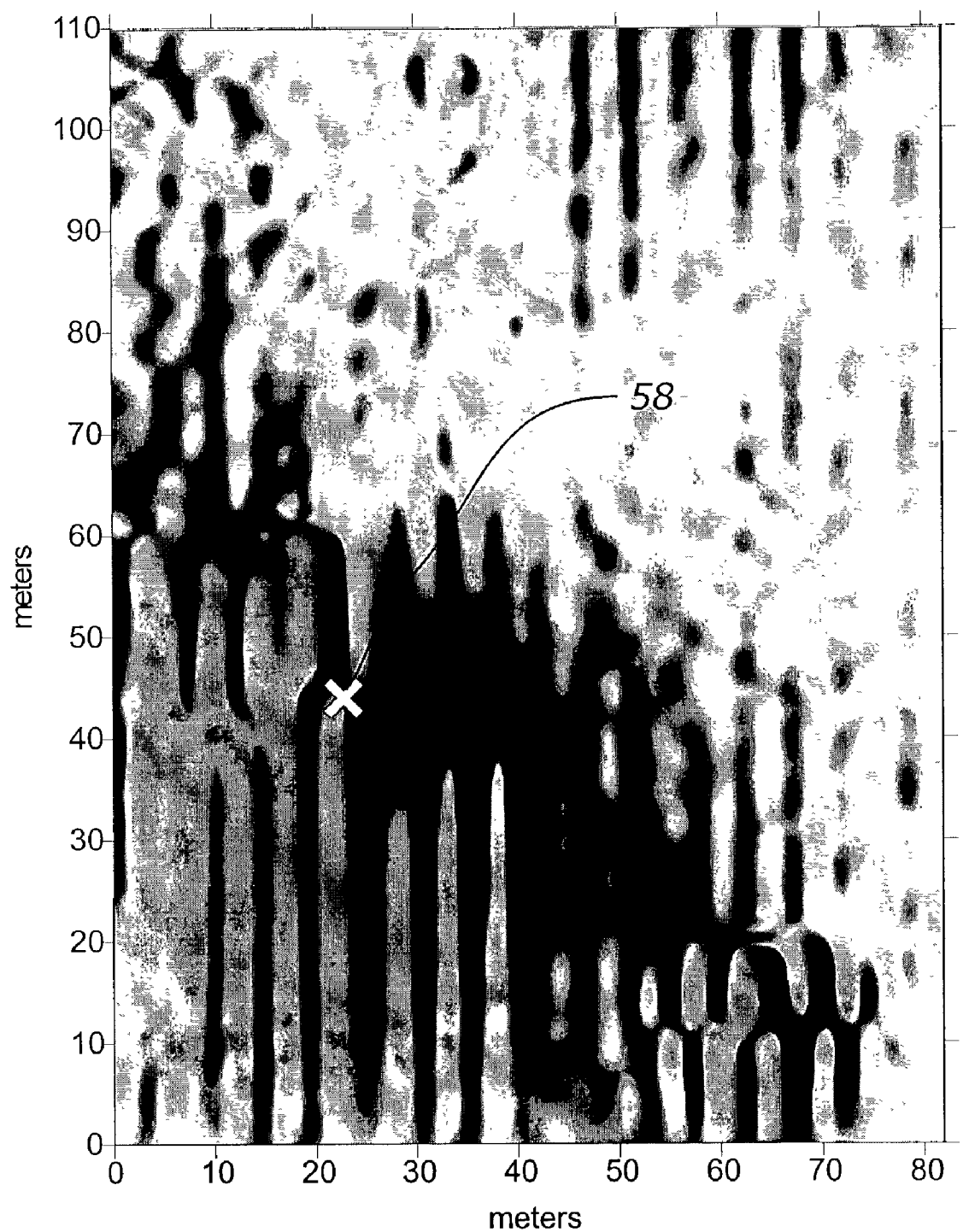
FIG. 8B is a shaded relief map corresponding to FIG. 8.
Figure 8C:
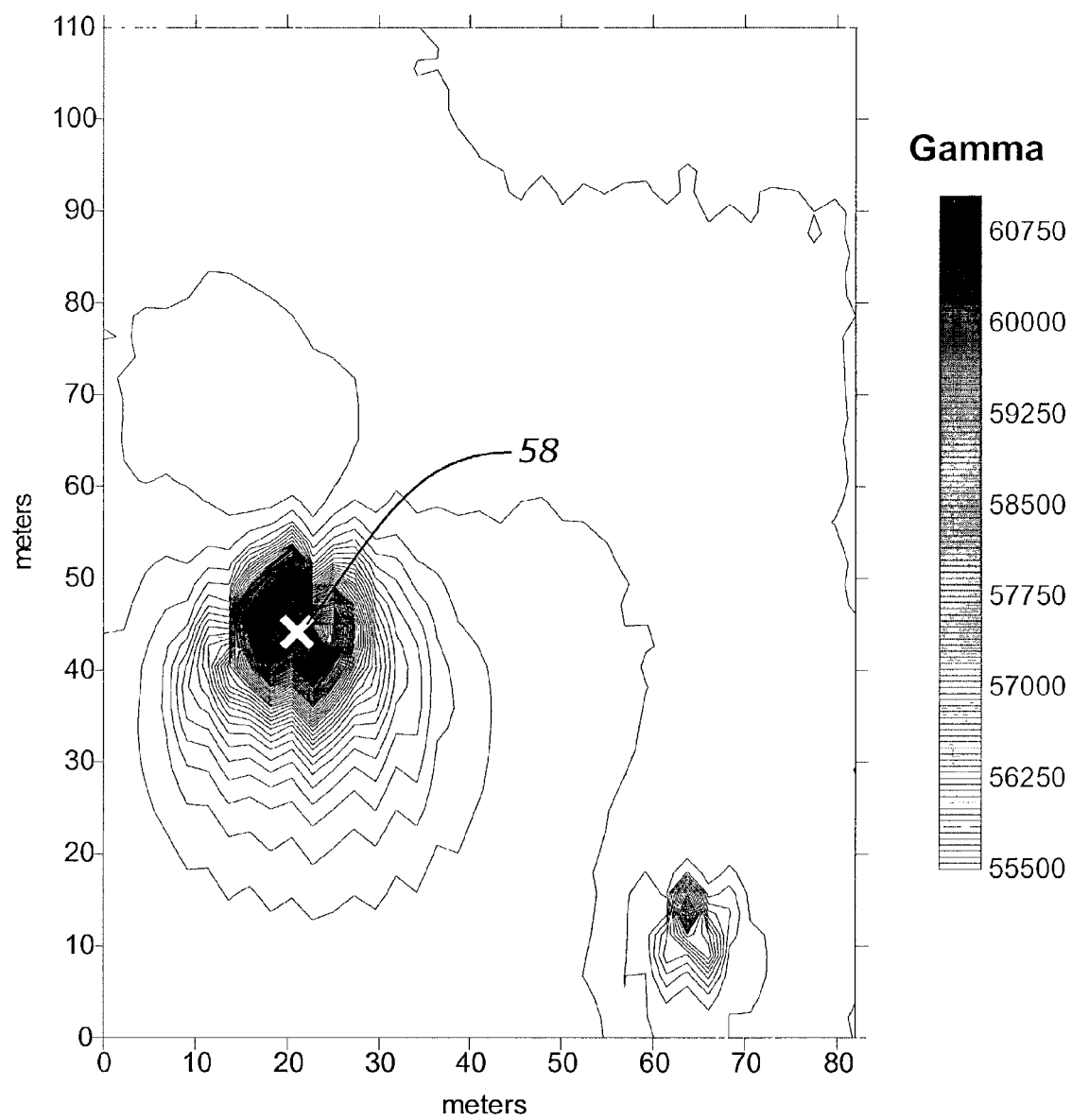
FIG. 8C is a contour map corresponding to FIG. 8.

The magnetic signature associated with a buried channel also changes with the depth of the magnetic source. In a shallow channel deposit, the center peak is usually isolated, not clustered with other peaks, before returning to the natural field. There are some instances where the center peak is not isolated and forms multiple apexes before returning to or below the natural field. One such case is shown in FIGS. 8, 8B and 8C where the center peak 58 is not isolated but forms multiple apexes. If this is the case, then the surrounding field can be analyzed to determine additional magnetic activity. Usually, a shallow signature is characterized by sharp and isolated peaks that once they return to the natural field after the magnetic high and low will tend to smooth out with little evidence of magnetic disturbances between the positive anomalies this is shown in FIG. 8.

When the magnetic source is deeper, the magnetic activity increases in the row and eventually will replace all of the areas of inactivity with constant magnetic highs and lows until the end of the row is reached. In such cases, the center peak tends to cluster or have multiple apexes before a second cluster is reached.

Figure 9:
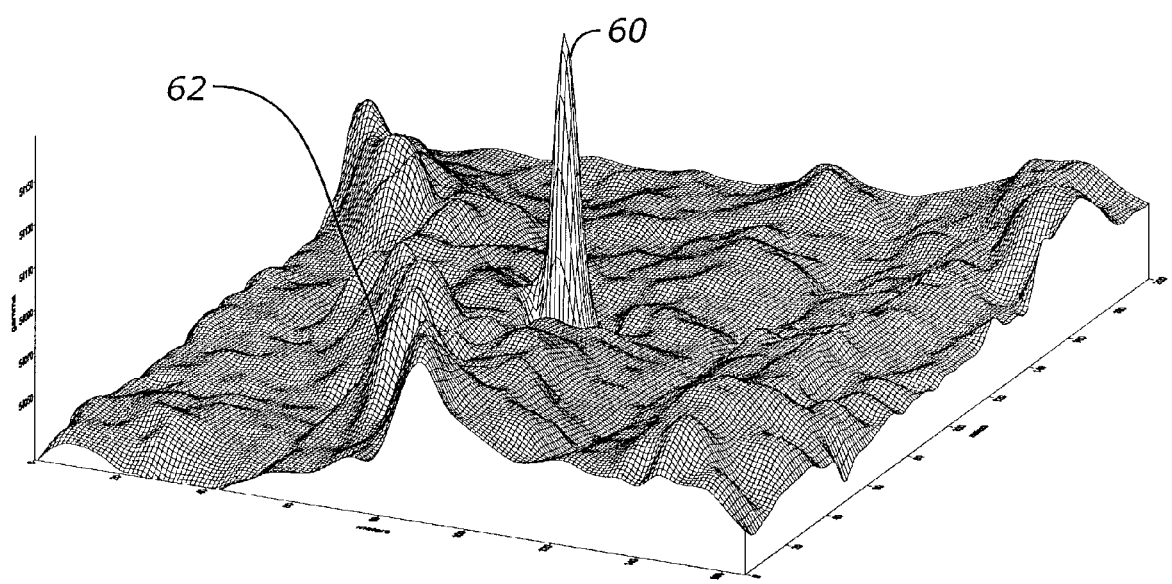
FIG. 9 is a three dimensional map of a magnetic signature associated with a narrow buried channel where the source is tilted approximately 90-degrees.
Figures 9B, 9C:
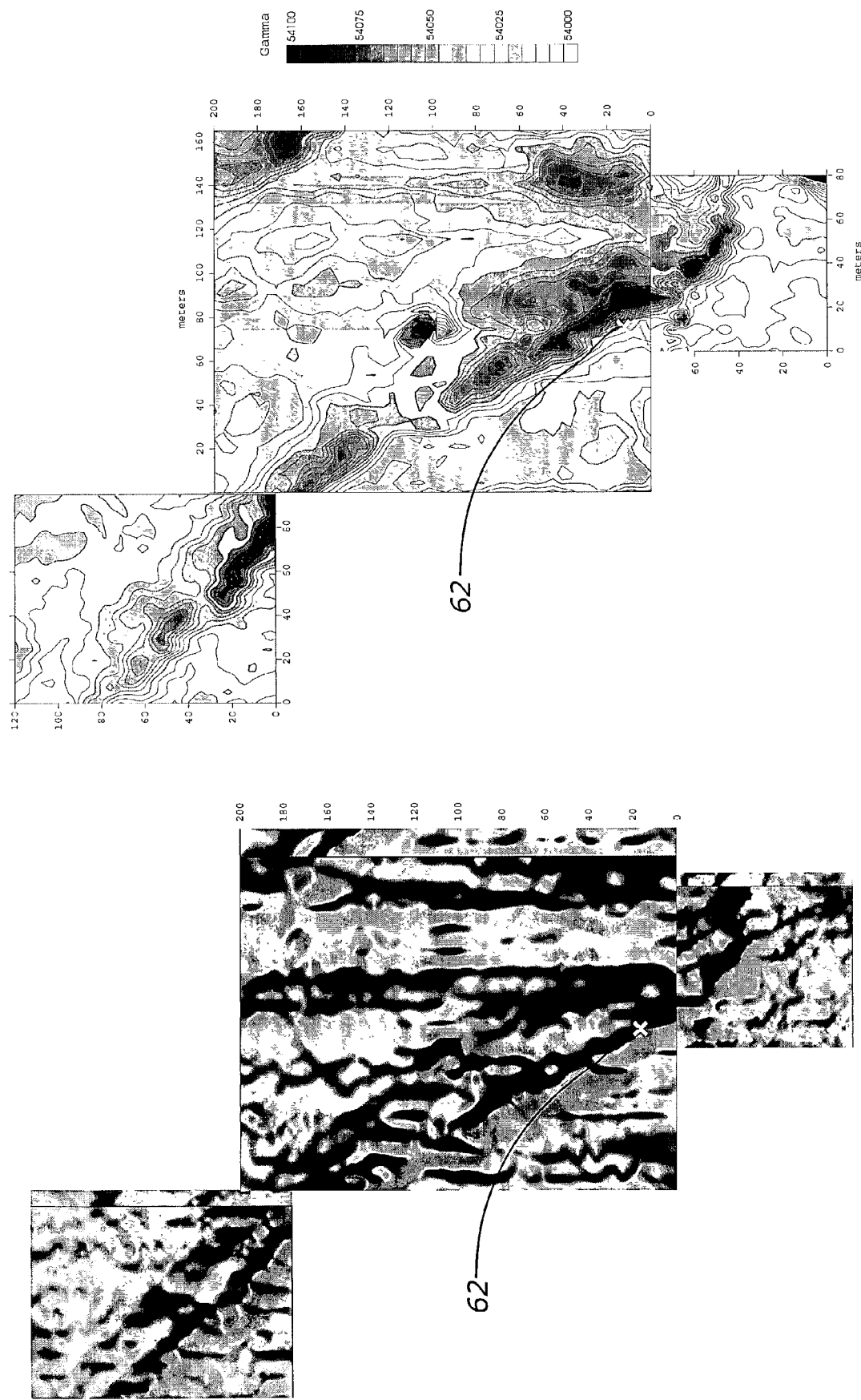
FIG. 9B is a shaded relief map corresponding to FIG. 9.
FIG. 9C is a contour map corresponding to FIG. 9.

The other type of magnetic signature that is associated with narrow channel deposits is a positive anomaly that forms a ridge down its axis rather than a row of magnetic highs and lows. In this case, the magnetic source is magnetized at or close to 90 degrees from the inclination of earth's natural field. Unlike the previous example, this signature affects the area around its axis with a region of magnetic high and low positioned normally to its axis. An example of this type of magnetic signature is shown in FIGS. 9, 9B and 9C. In FIG. 9, the magnetic anomaly forms a ridge down its axis rather than a row of magnetic highs and lows. The peak 60 shown is a magnetic disturbance from a buried cement tank and point 62 indicates a preferred drilling location for accessing the narrow channel deposit.

Figure 10:
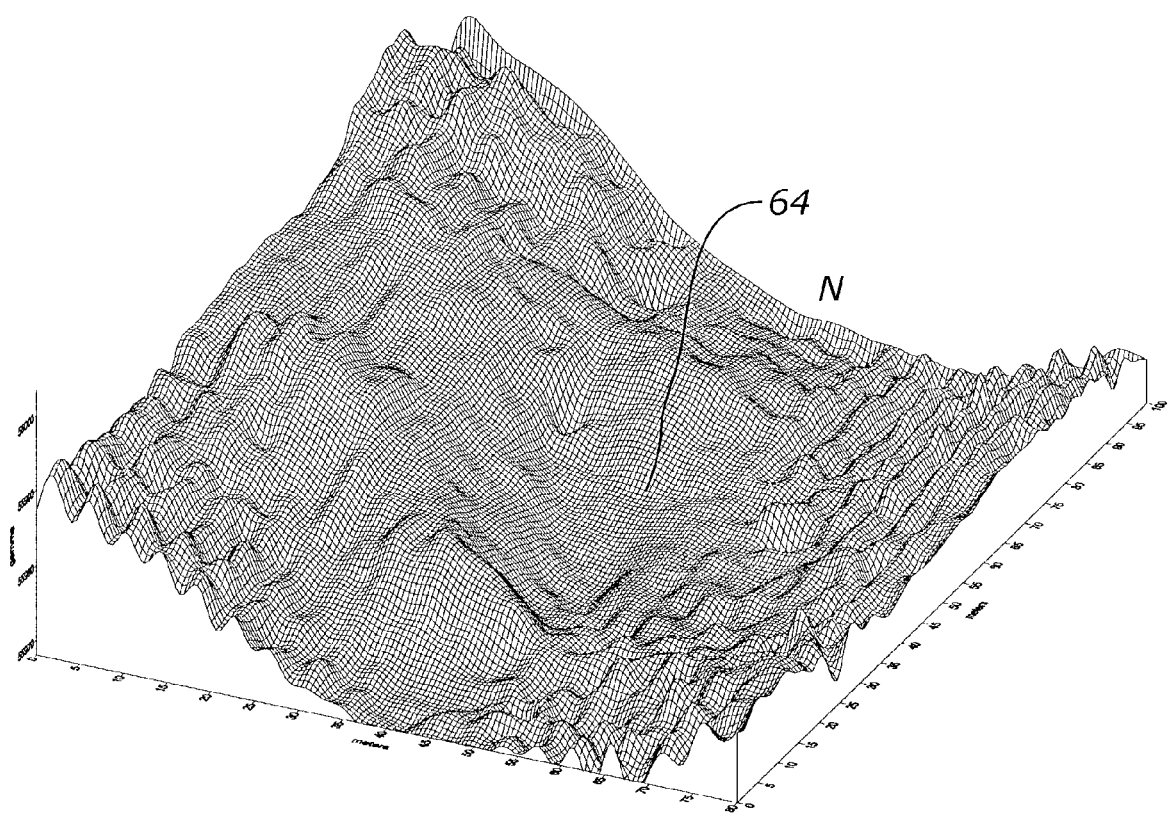
FIG. 10 is a three dimensional map of a magnetic signature associated with a narrow buried channel where the source is dipping to the east.
Figures 10B, 10C:
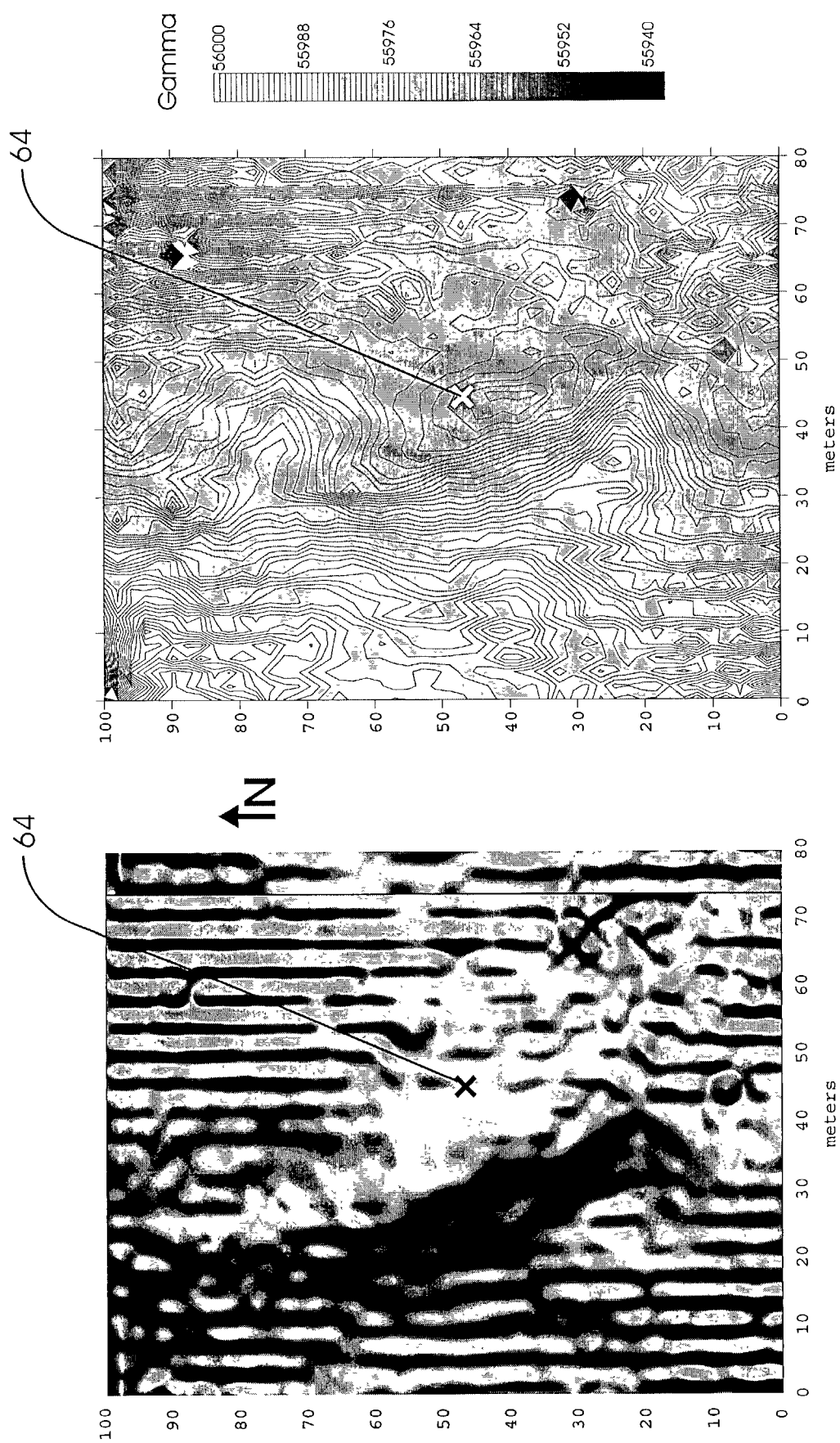
FIG. 10B is a shaded relief map corresponding to FIG. 10.
FIG. 10C is a contour map corresponding to FIG. 10.

A second type of underground fluid source is a wide channel deposit. Unlike narrow channel deposits, the magnetic signatures of wide channel deposits are usually characterized by a magnetic low surrounded by a region of magnetic highs or more commonly between ridges of positive anomalies that run parallel to the axis of the magnetic source. The parallel positive anomalies may vary in magnitude, with respect to each other, depending on the dip or inclination of the source normal to its axis. The center is usually characterized by a ridge that extends nearly normal to the main parallel ridges and curls around a region of magnetic low to form a bow or crescent shaped area. If the channel is long enough, other bowl shaped areas will appear in between the parallel positive ridges or regional magnetic high. As distance increases from the center, the bowl shaped anomalies will usually elongate and become less defined. Also, depending on the inclination of the source parallel to the axis, the bowl shaped areas can either be on both sides, or isolated only to one side, of the center. These signatures are very similar to that of narrow channel deposits but instead of a magnetic high, or cluster, they are usually replaced with bowl-shaped magnetic lows. FIGS. 10, 10B and 10C illustrate a wide channel's magnetic signature with a center 64.

Figure 15:
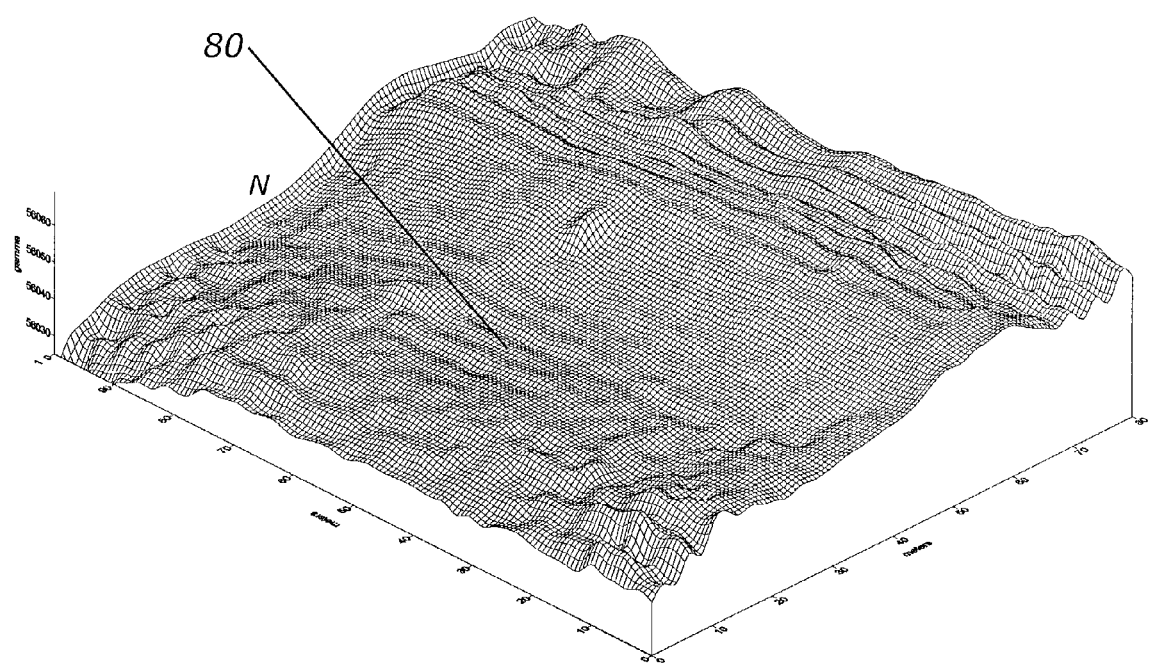
FIG. 15 is a three dimensional map of a magnetic signature associated with a wide channel where the source is tilted 90-degrees.
Figure 15C:
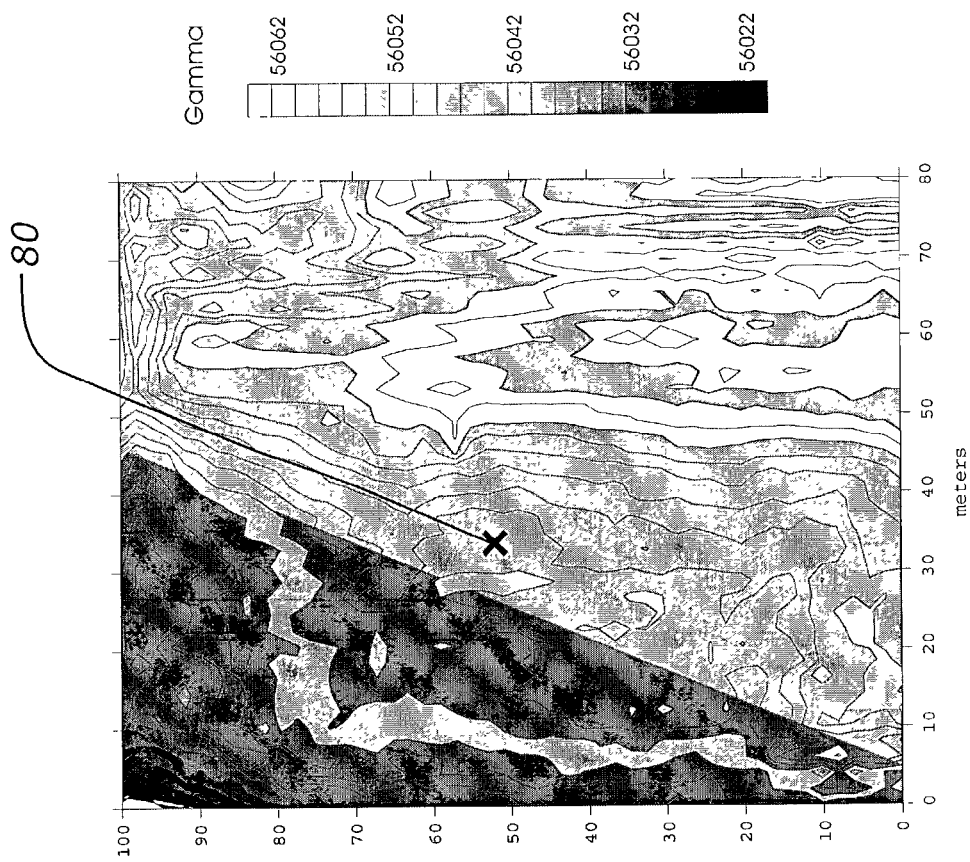
FIG. 15C is a contour map corresponding to FIG. 15.
Figure 15B:
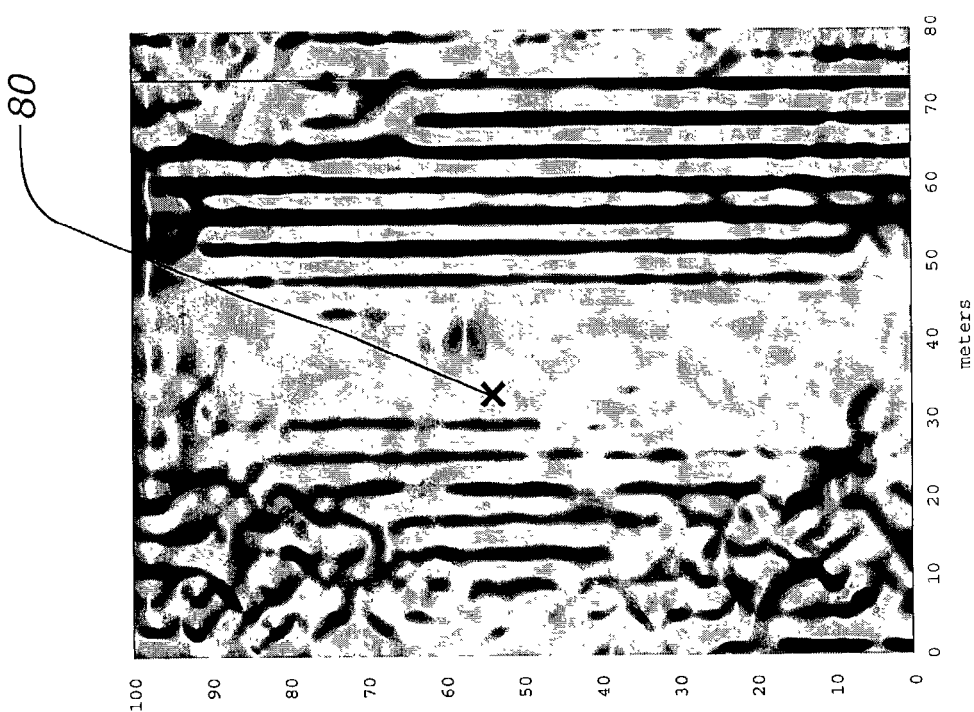
FIG. 15B is a shaded relief map corresponding to FIG. 15.

If the wide channel is tilted to approximately 90 degrees, normal to its axis, then one of the positive ridges, that run parallel to the source, (which ridge depends on the directional tilt of the source), will be replaced by a negative anomaly, or valley. If a cross-section, normal to the axis, were drawn, the signature would look like a stairstep where a positive anomaly dips down to a plateau, usually with a magnetic field close to the natural magnetic field, before descending to an area of a magnetic low. The center is usually surrounded on one side, in this case, by a positive ridge that resembles a crescent shape and is located on the plateau between the regional magnetic high and low. An example of this type of anomaly is shown in FIGS. 15, 15B and 15C where a center 80 of the wide channel deposit is shown.

Figure 11:
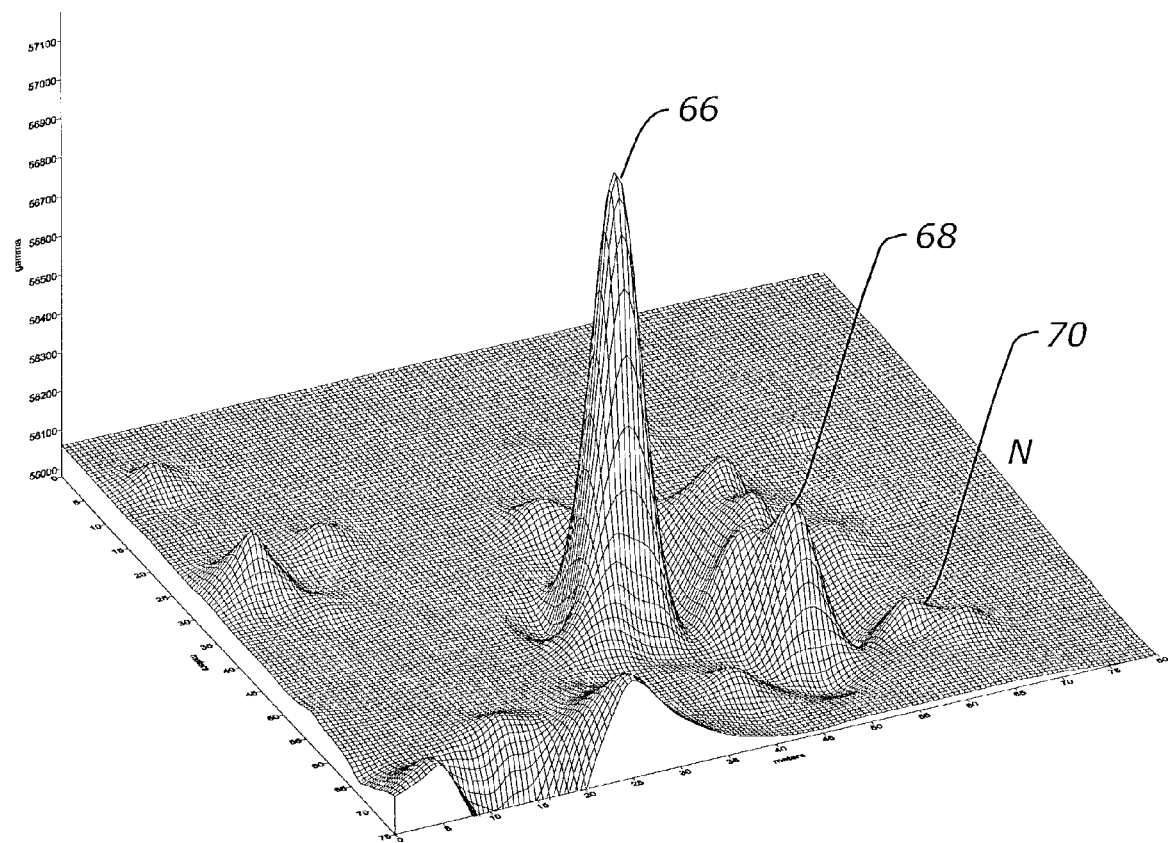
FIG. 11 is a three dimensional map of a magnetic signature associated with a regional aquifer where the source is dipping to the southeast.
Figure 11C:
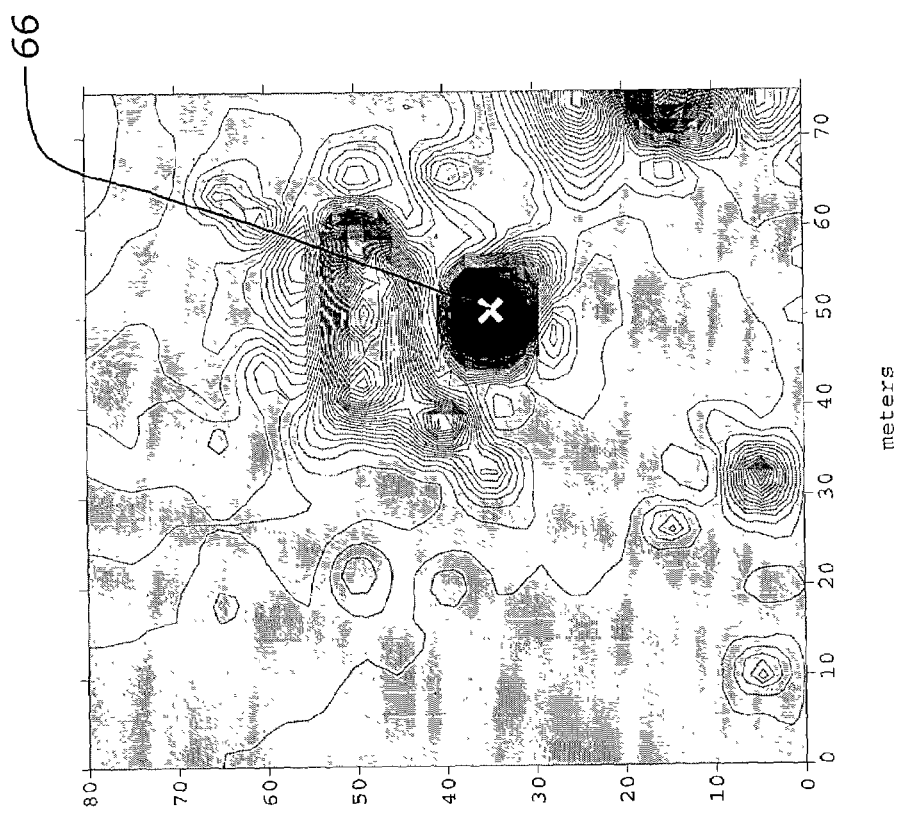
FIG. 11C is a contour map corresponding to FIG. 11.
Figure 11B:
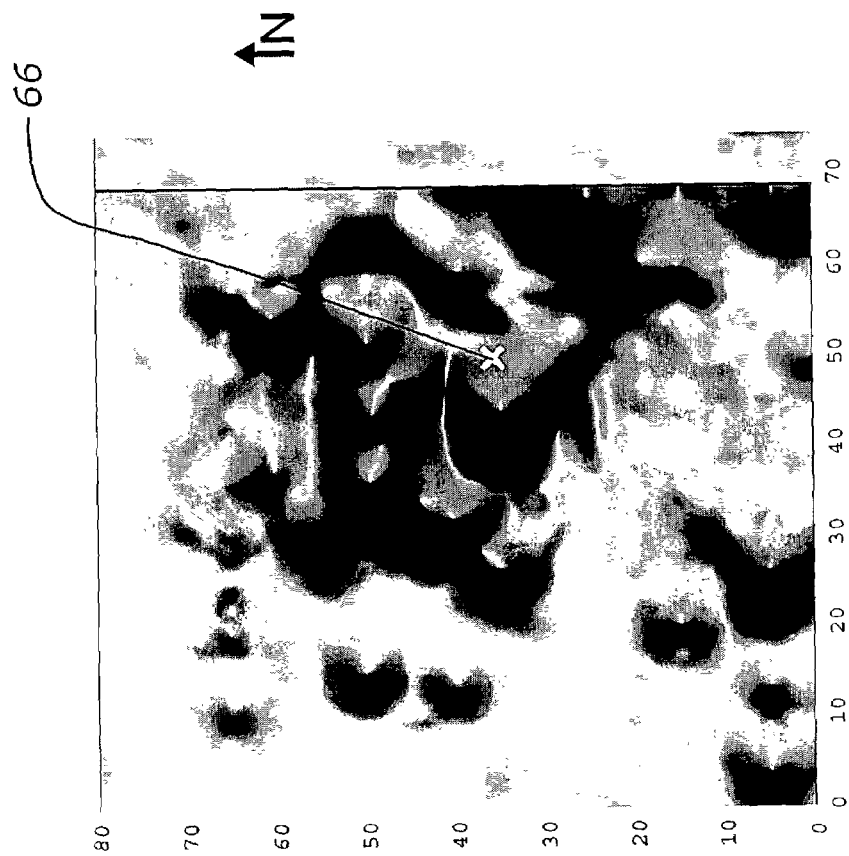
FIG. 11B is a shaded relief map corresponding to FIG. 11.

The third type of underground fluid source is a regional aquifer. Magnetic signatures that emanate from a regional aquifer are similar to that of narrow channel deposit but because of the relatively equal length/width ratio in a regional aquifer, the magnetic signature affects a relatively equal proportional area. If the aquifer's axis is horizontal, or nearly horizontal, the magnetic signature will be characterized with a magnetic high in the center with concentric rings, or ridges, of magnetic highs around the center. As the distance from the center increases, the concentric ridges will become larger in diameter similar to that of a target. Usually the center anomaly is the highest in magnitude with each of the concentric anomalies dissipating in magnitude and becoming broad with increased distance from the center. FIGS. 11, 11B and 11C illustrate a magnetic signature of a regional aquifer showing a center peak 66, a first order peak 68, and a second order peak 70. For purposes of explanation, each concentric ridge is assigned an order number where the closest concentric ridge to the center will be the first order concentric ridge and the next closest concentric ridge will be the second order and so forth.

Figure 12:
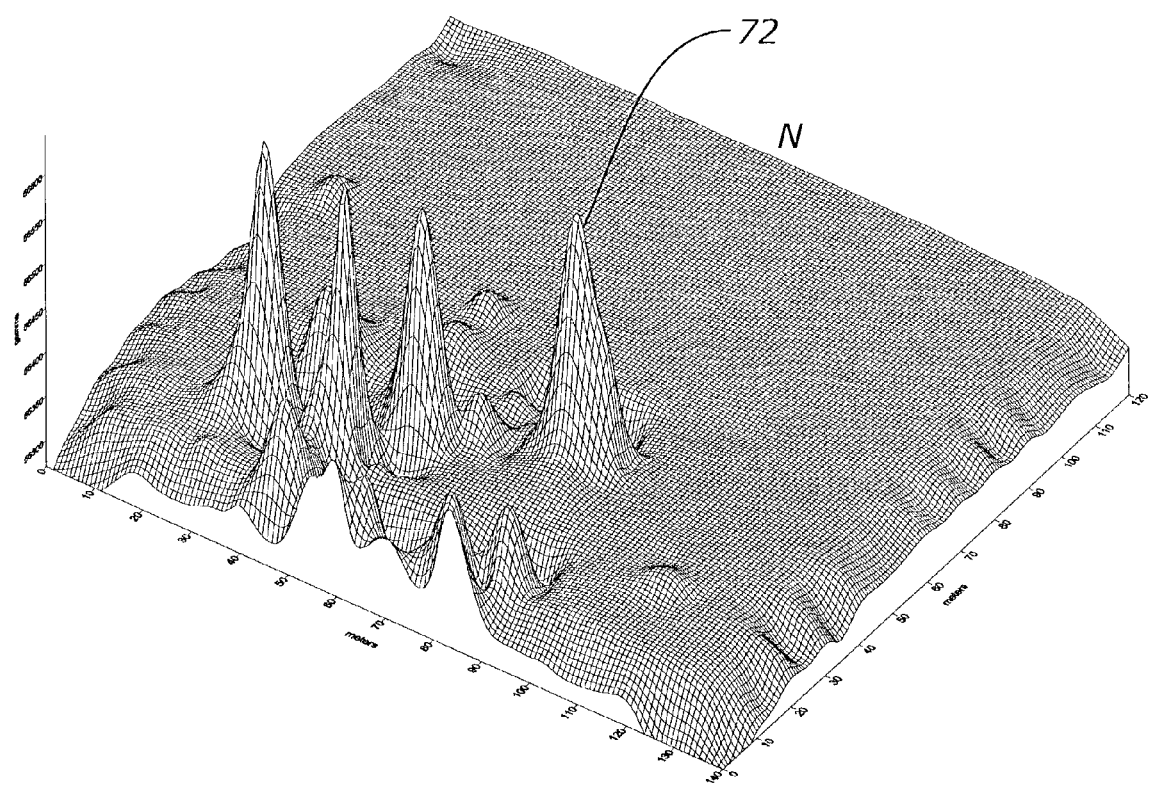
FIG. 12 is a three dimensional map of a magnetic signature associated with a regional aquifer where the source is dipping to the northeast.
Figures 12B, 12C:
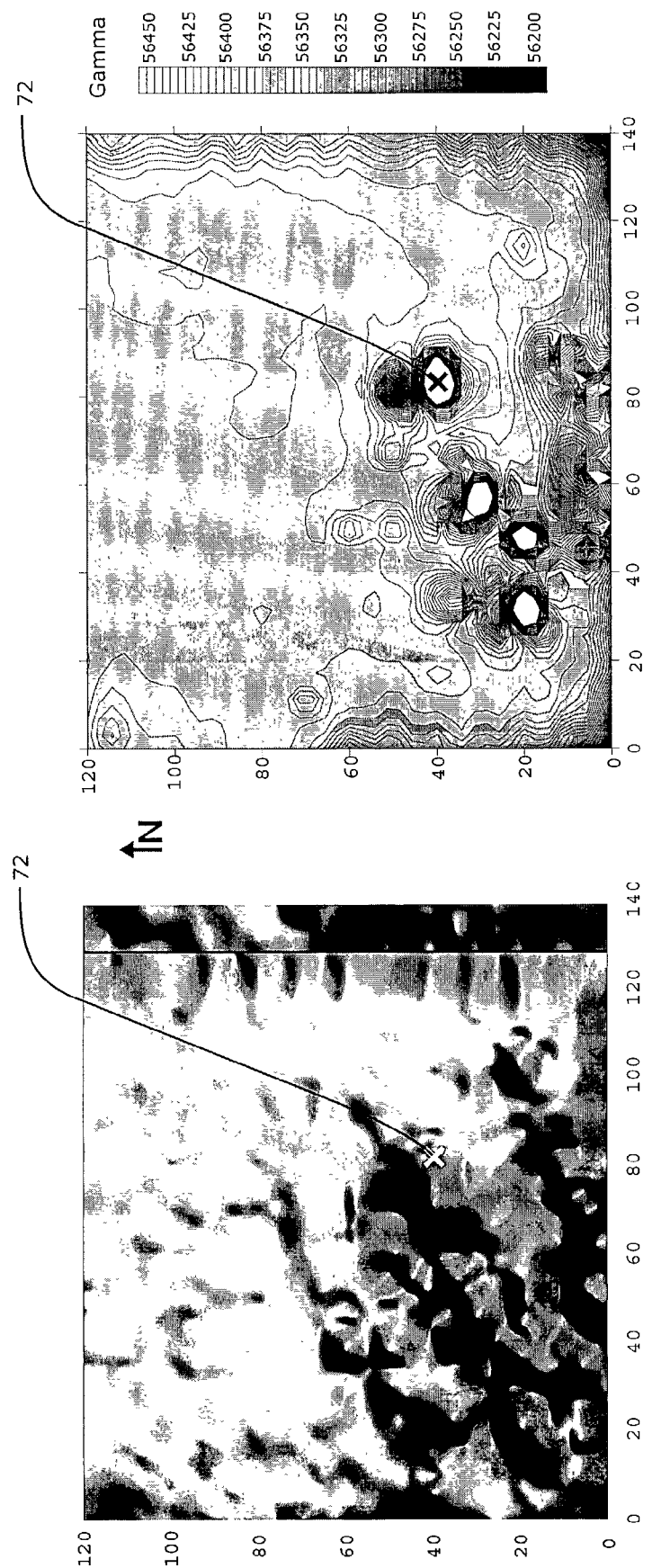
FIG. 12B is a shaded relief map corresponding to FIG. 12.
FIG. 12C is a contour map corresponding to FIG. 12.

As the regional aquifer tilts to a greater degree down its axis, the concentric ridges are transformed into semi-circles with only half, or partial, of the ring showing around one side of the center. The other portion of the ring is no longer represented at the surface of the ground. In this case the aquifer is dipping, or inclined downward, toward the area where there are no magnetic ridges. As shown in FIGS. 12, 12B and 12C, the aquifer is dipping to the northeast with the center represented in the same manner as in the horizontal model by a center peak 72. This is similar to the narrow channel signature because, at a certain degree of tilt of the source, up to one half of the signature will not reach the surface of the ground.

Figure 13:
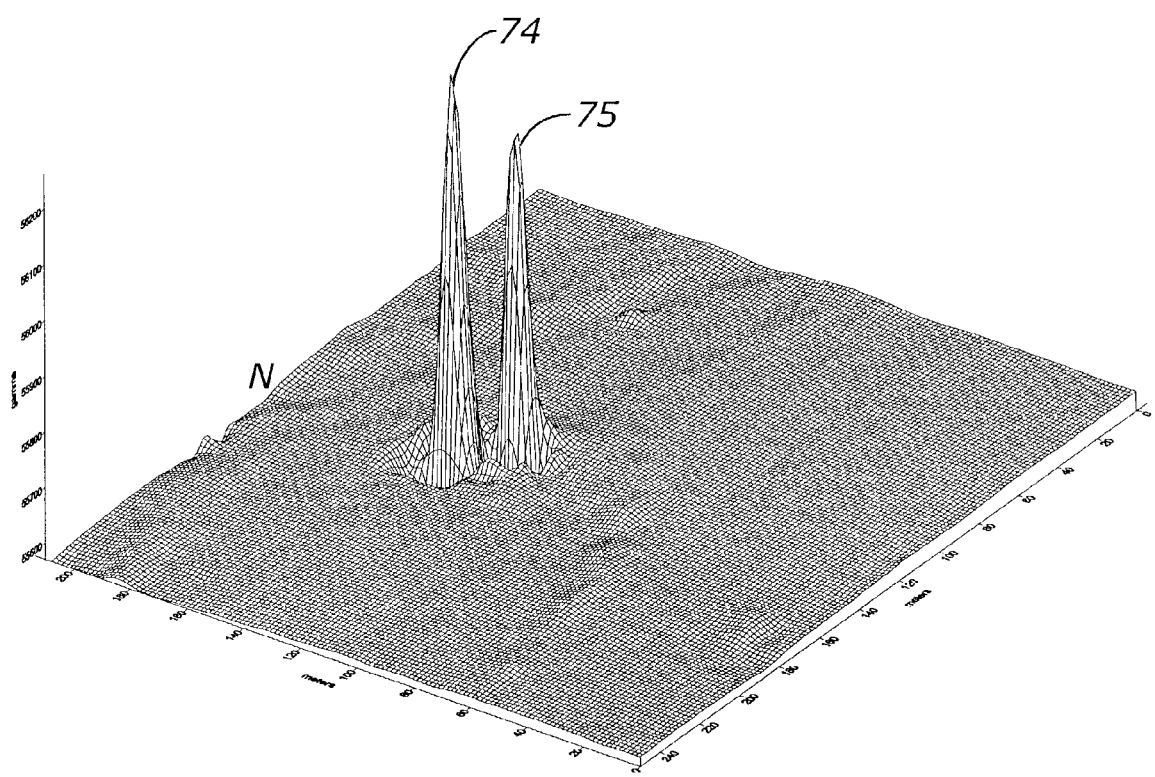
FIG. 13 is a three dimensional map of a magnetic signature associated with a regional aquifer where the source is dipping to the south.
Figures 13B, 13C:
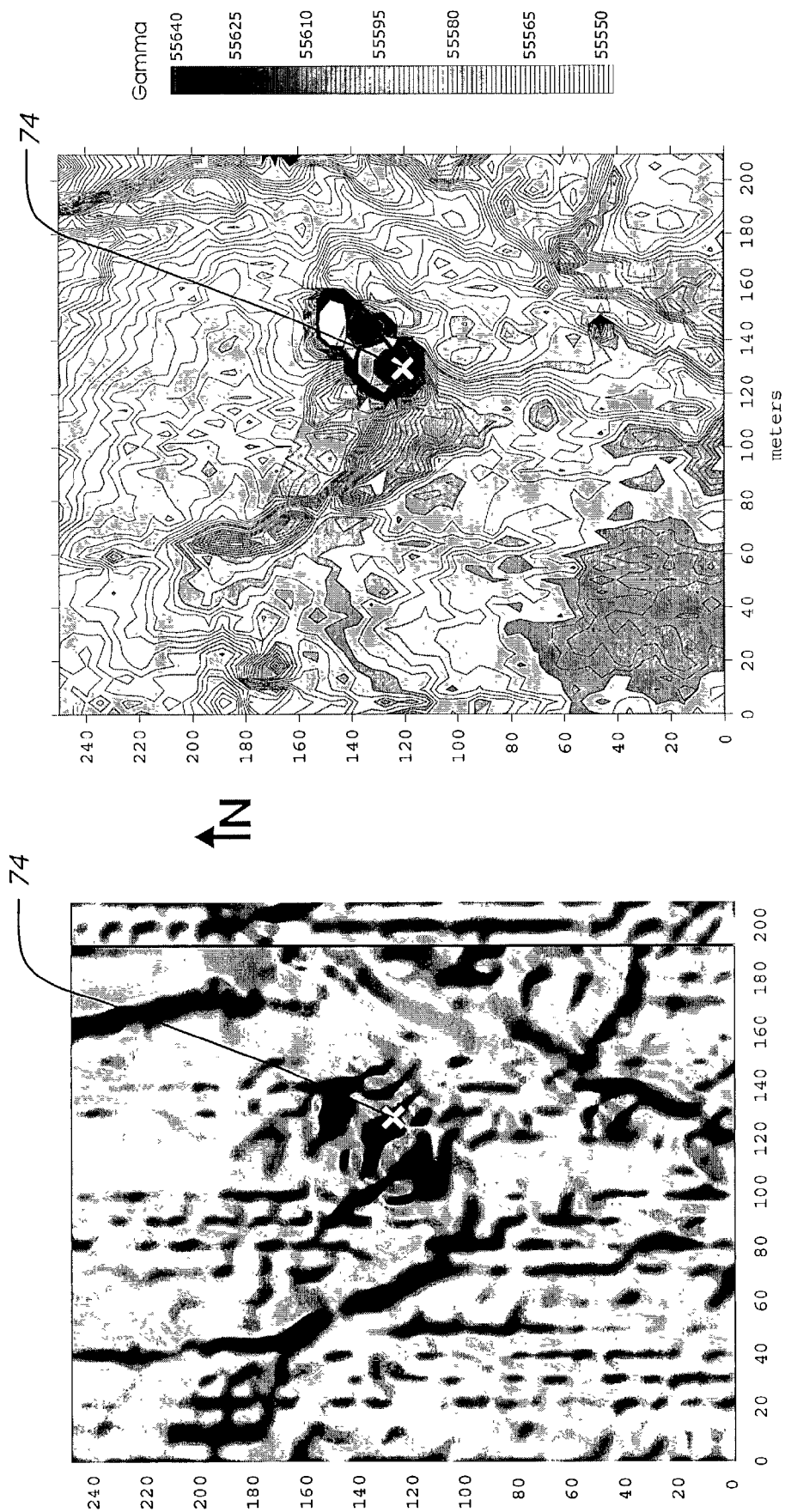
FIG. 13B is a shaded relief map corresponding to FIG. 13.
FIG. 13C is a contour map corresponding to FIG. 13.
Figure 14:
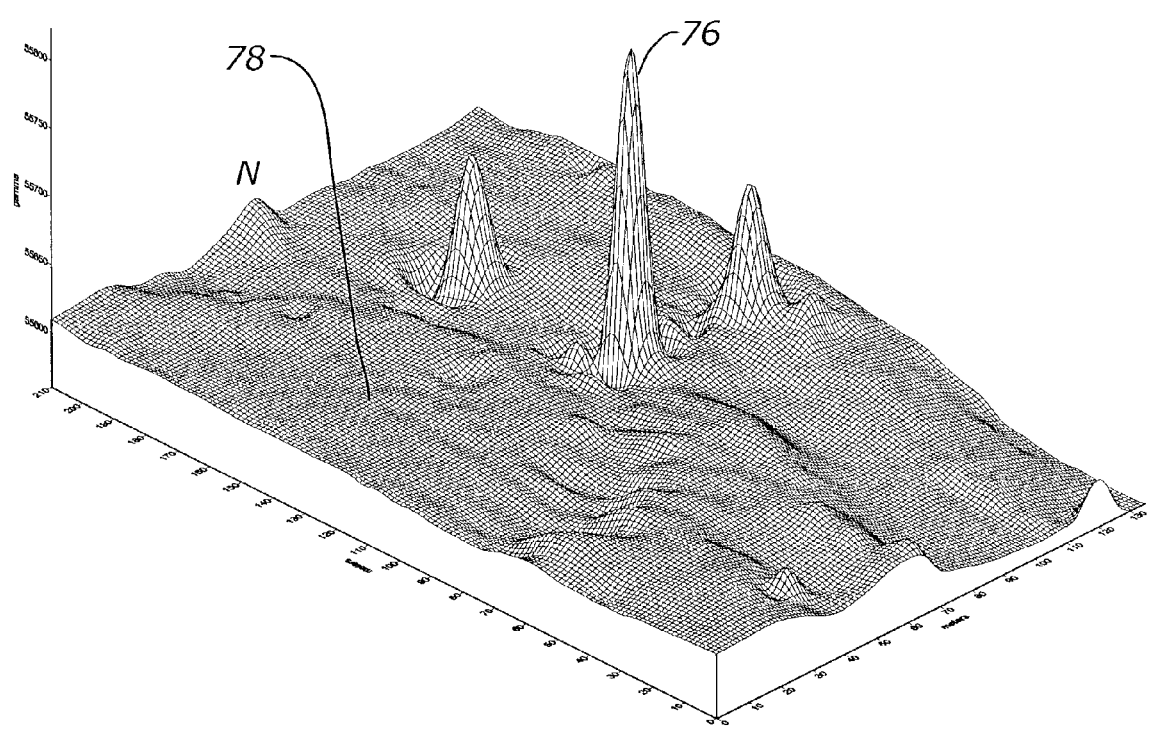
FIG. 14 is a three dimensional map of a magnetic signature associated with a regional aquifer where the source is dipping to the southeast.
Figure 14C:
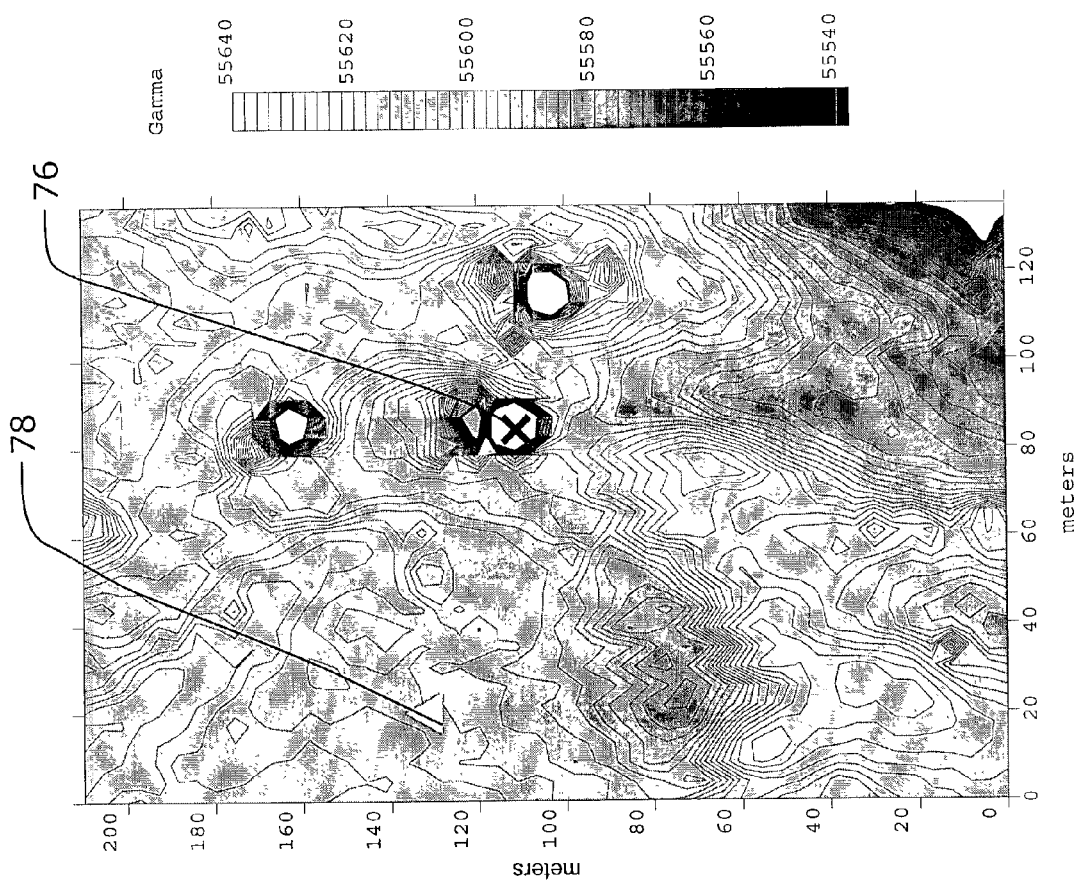
FIG. 14C is a contour map corresponding to FIG. 14.
Figure 14B:
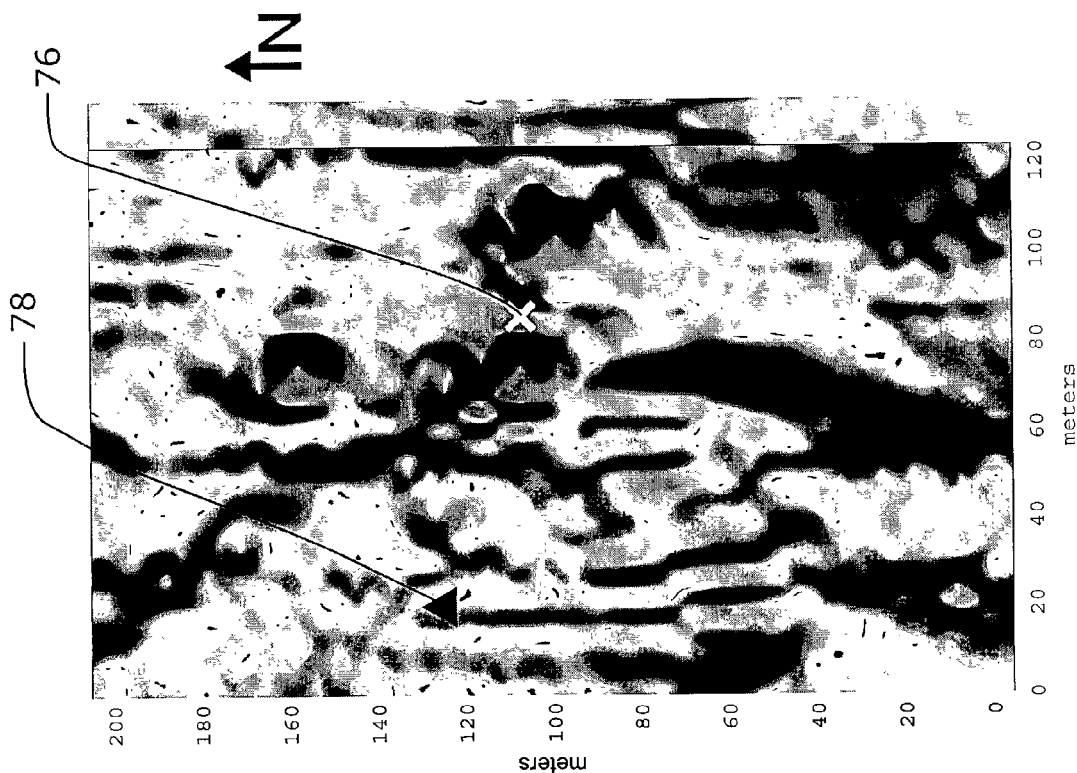
FIG. 14B is a shaded relief map corresponding to FIG. 14.

If the axis of the regional aquifer is tilted to a greater degree then the magnetic signature will change once again. Instead of the concentric ridges surrounding, or partially surrounding the center, it will curl in the opposite direction and move away from the center. This is shown in FIGS. 13, 13B, 13C, 14, 14B and 14C. In FIG. 13, a center peak 74 is shown and a second peak 75 is also present. In FIG. 14, a center peak 76 is shown and a drilling site or location 78 for the aquifer is also shown. As these ridges become farther from the center, they tend to become smaller in diameter, elongated and dissipate in intensity. Usually the vertex of the ridge will exhibit the largest positive anomaly with the remainder of the ridge reduced in magnitude. However, the center is usually represented by the highest peak and in this case a line of peaks, or positive anomalies, run nearly normal to the axis of the magnetic ridges as shown in FIG. 14. The axis of the source is usually where the ridge's vertex is located.

Figure 20:
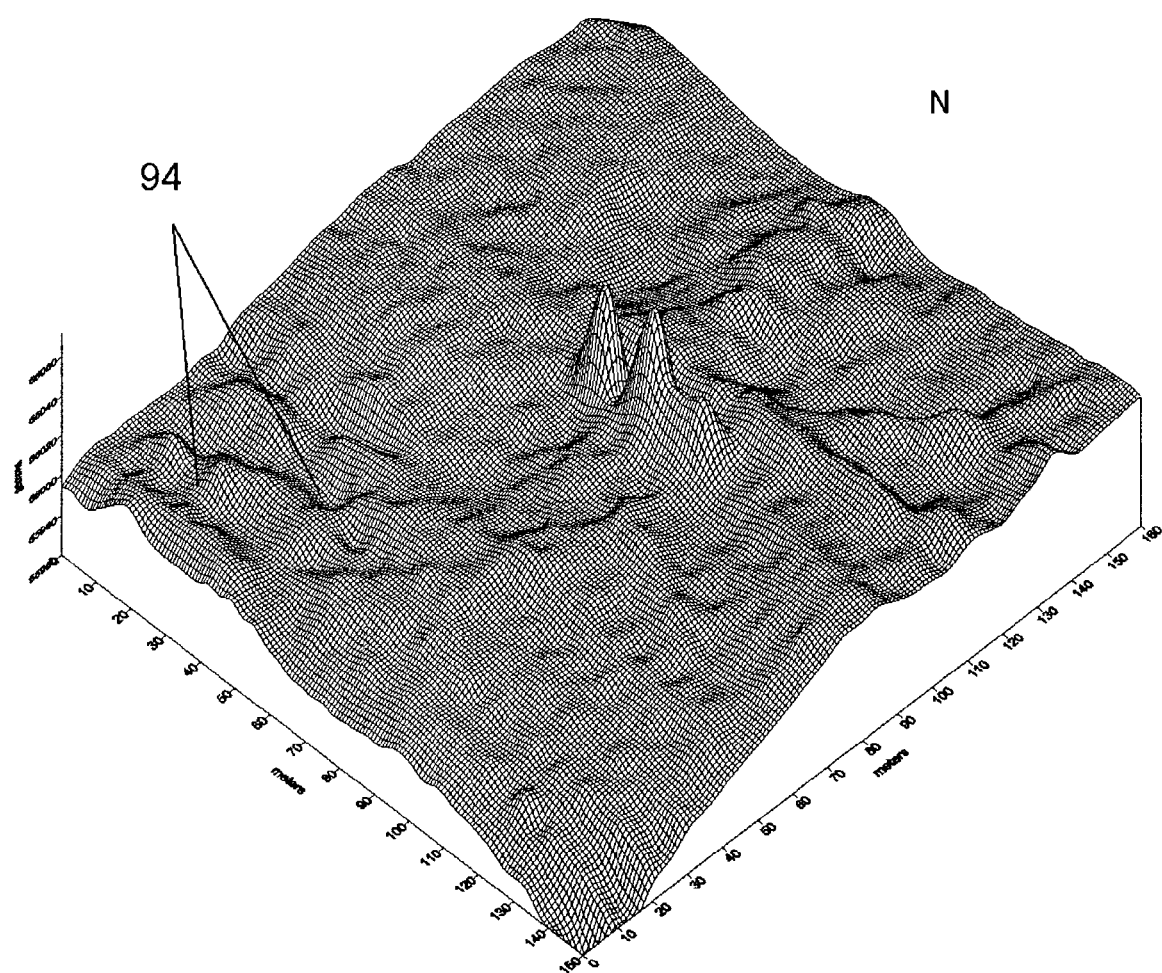
FIG. 20 is a three dimensional map of a magnetic signature associated with a buried fence.
Figure 20C:
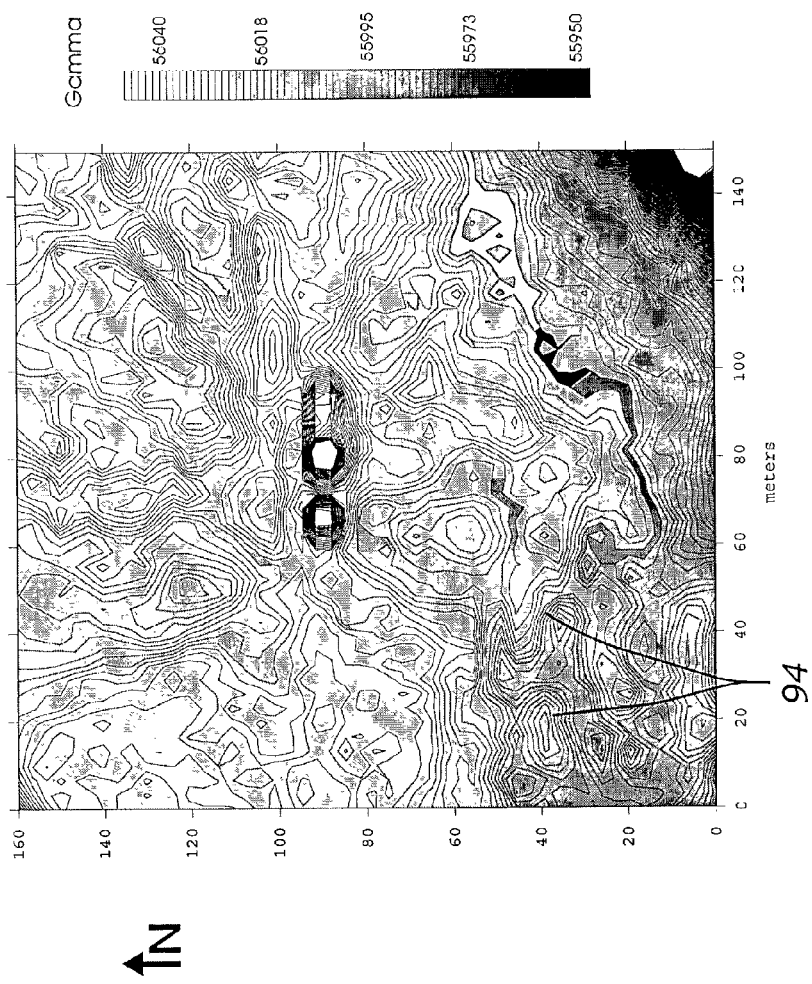
FIG. 20C is a contour map corresponding to FIG. 20.
Figure 20B:
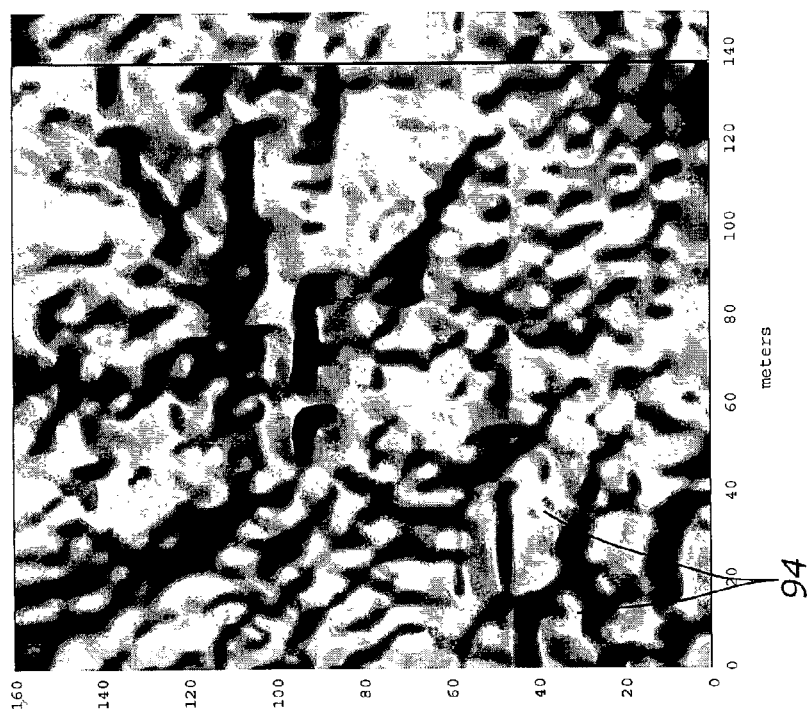
FIG. 20B is a shaded relief map corresponding to FIG. 20.

Interpretation of regional magnetic signatures involves surveying and mapping a larger area to determine where to drill. The vertex of the ridge and its relationship to the surrounding anomalies is vital to the correct interpretation of the data. In FIGS. 20, 20B and 20C at first glance drilling may be advised to be on the highest positive anomaly, or peak, but a closer look reveals that some ridges, that connect to the small peaks, traverse in one direction, nearly 180 degrees from the others ridges, and then curl back in the opposite direction, the same direction as the other ridges, as distance increases from the most prominent peaks. This type of signature is at the end of a source's axis and instead of the center being on the apex, or highest peak, it is encircled by the positive ridges much like that of a horizontal aquifer. If the parameters of this map were extended to the east, it would show that at the center the positive ridges would disappear with up to one-half of the signature absent as in FIGS. 12, 12B and 12C.

Figure 16:
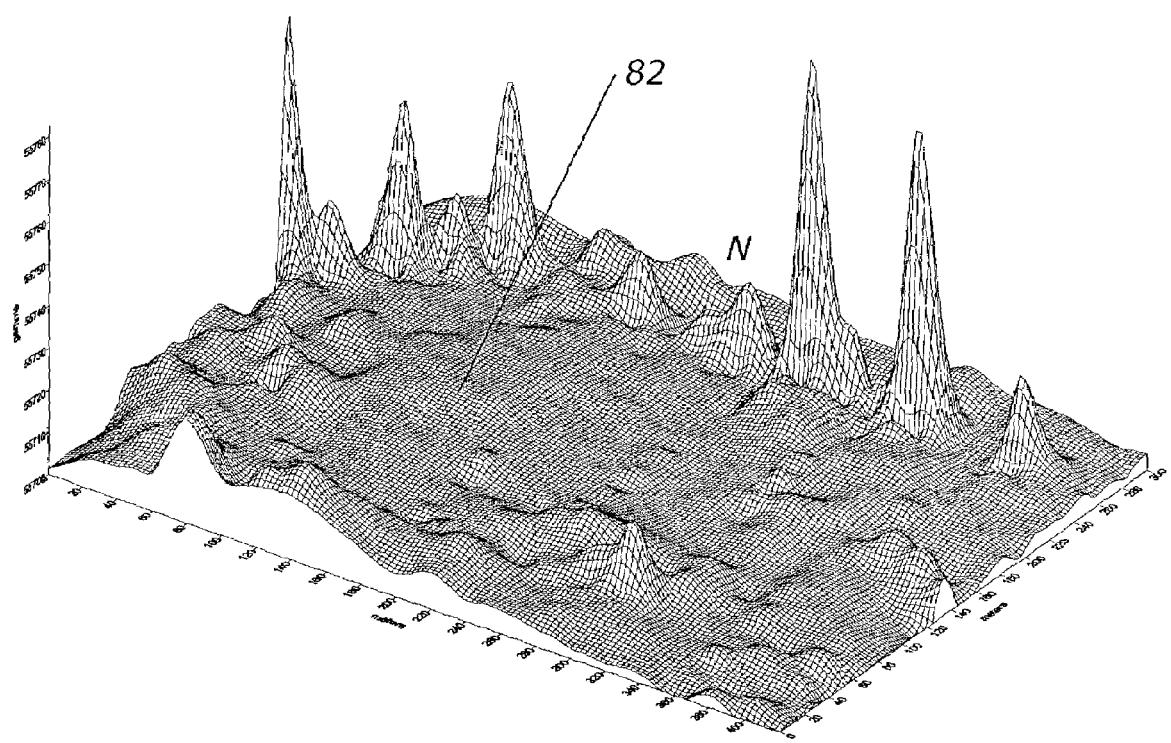
FIG. 16 is a three dimensional map of a magnetic signature associated with a regional aquifer where the source is dipping to the south.
Figure 16C:
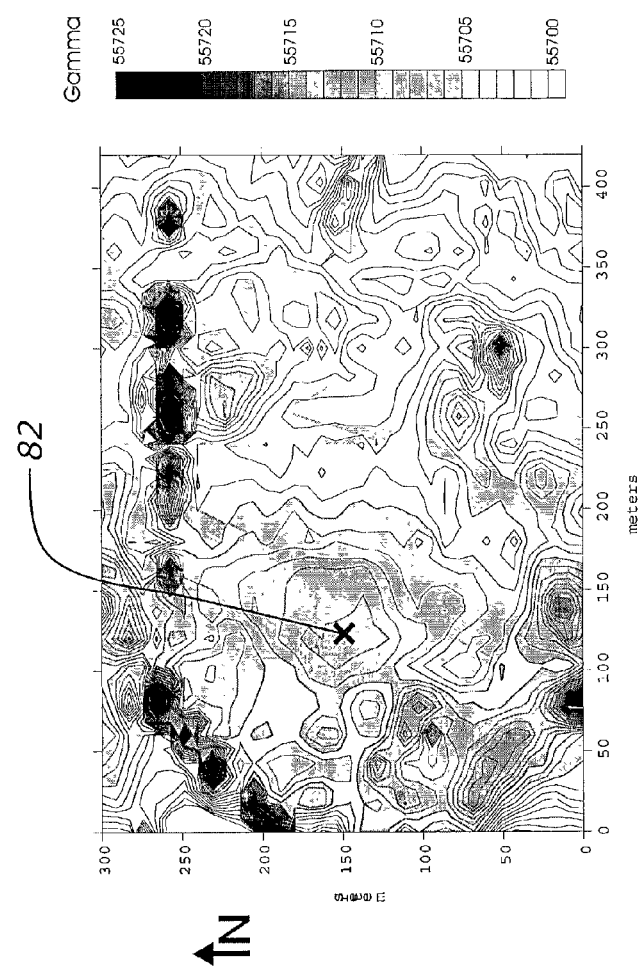
FIG. 16C is a contour map corresponding to FIG. 16.
Figure 16B:
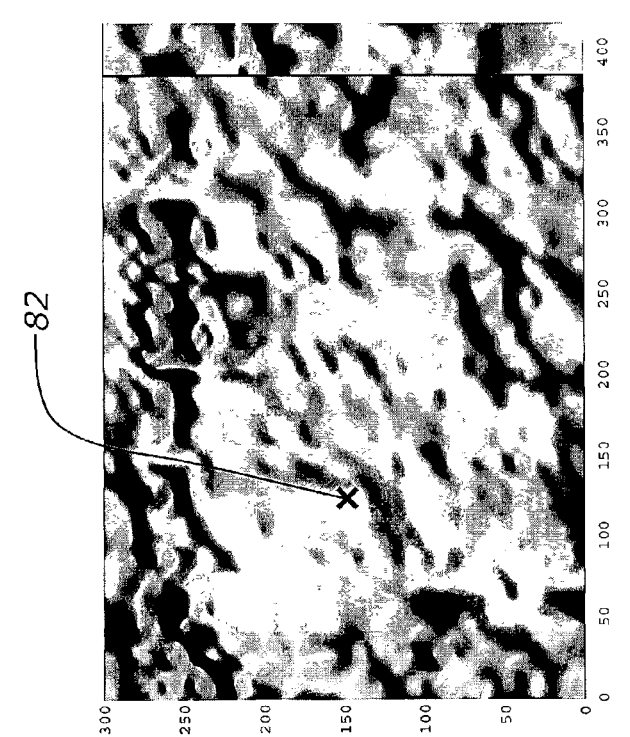
FIG. 16B is a shaded relief map corresponding to FIG. 16.

When a regional aquifer is tilted, to a certain degree, normal to its axis, then the concentric ridges, or row of peaks, will have a greater magnitude on the one side of the aquifer and will dissipate in intensity as the concentric ridge changes direction around the center. In FIGS. 16, 16B and 16C, the aquifer is dipping to the south because the magnitude of the ridge is much higher on the north side than on the south side. The center 82 is between both ridges. If the magnetic source, in FIG. 16, was tilted to a greater degree on its side then the remaining positive anomalies on the south side would disappear and only the north side would remain.

Figure 17:
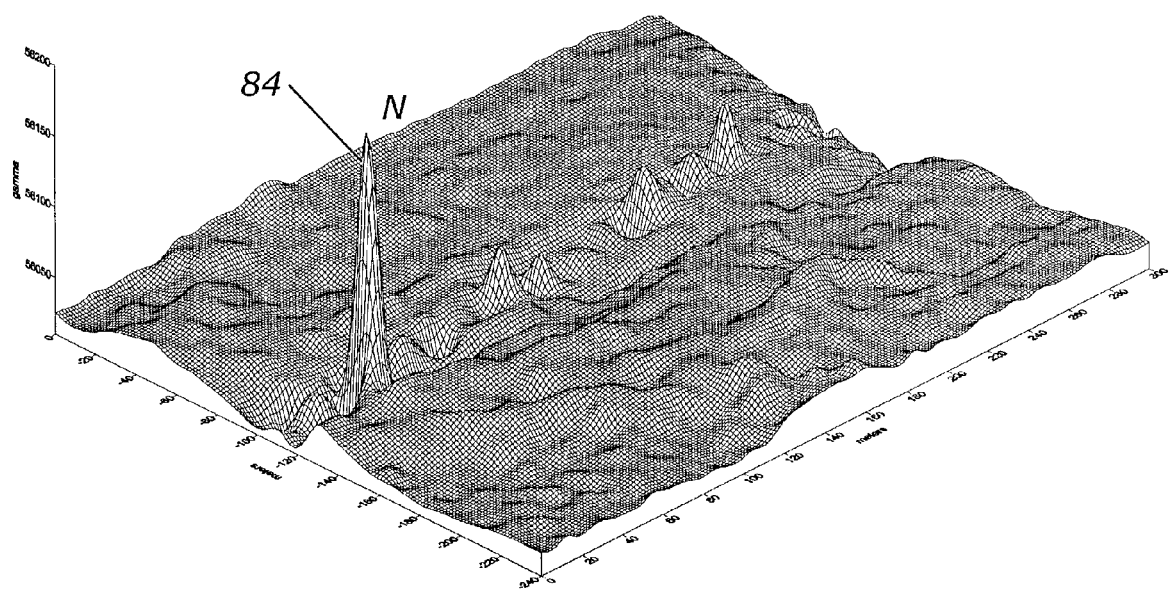
FIG. 17 is a three dimensional map of a magnetic signature associated with a regional aquifer where the source is dipping to the west.
Figures 17B, 17C:
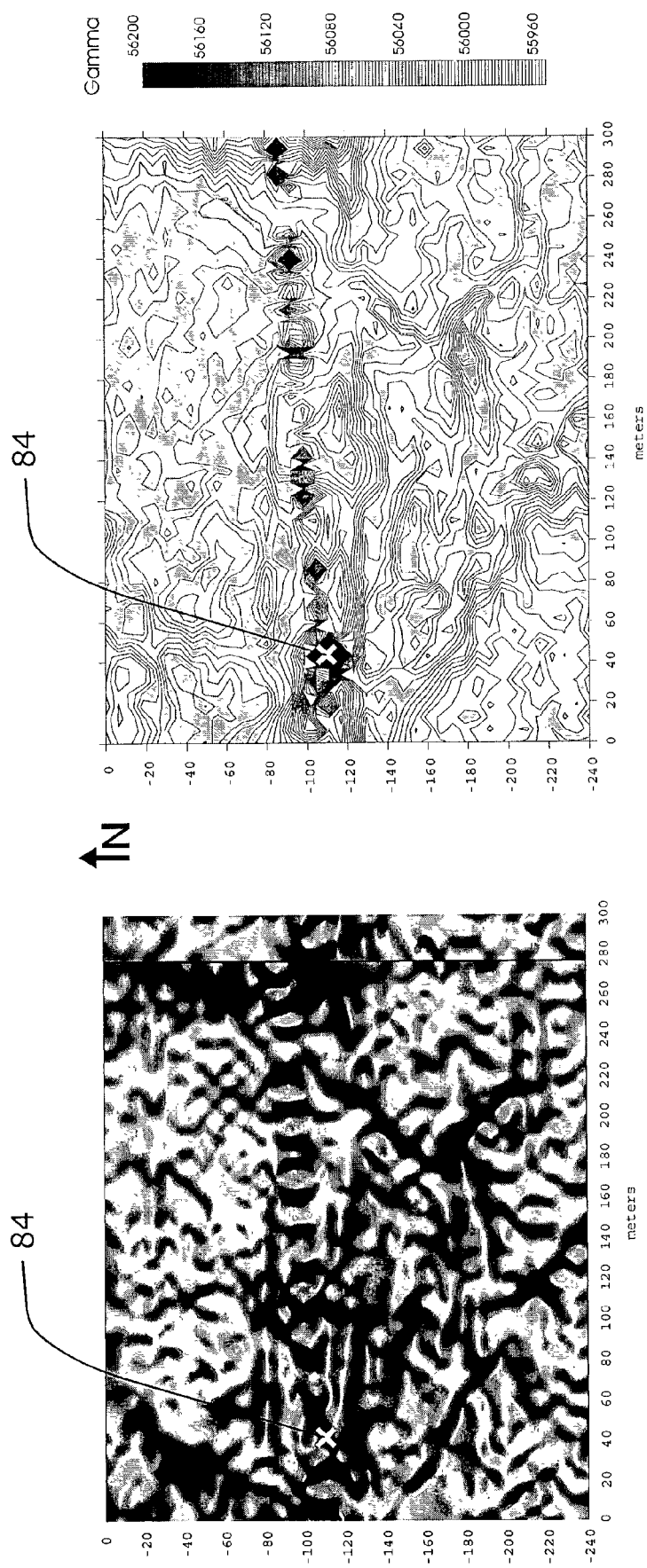
FIG. 17B is a shaded relief map corresponding to FIG. 17.
FIG. 17C is a contour map corresponding to FIG. 17.

In interpreting magnetic signatures, the present invention contemplates that each aquifer can have characteristics of multiple magnetic signatures depending on its length/width ratio and dip. For example, a narrow channel, when it begins to increase in width, will begin to take on magnetic characteristics of a wide channel or a regional aquifer depending on its length/width ratio. As a source makes a transition from a narrow channel to a regional aquifer, first and second order ridges begin to develop and co-exist with rows of peaks. In FIGS. 7, 7B and 7C, the horizontal narrow channel deposit is beginning to take on characteristics of a regional aquifer with a first order ridge surrounding the main peak 56. Another example is in FIGS. 17, 17B and 17C, with a row of peaks (including center peak 84) that run through a circular ridge splitting it in half. In this case, the source is deep and dipping at a high degree to the west. The vertex of a ridge, or the portion of the ridge that is at the closest inclination to that of the natural field, will usually exhibit the largest positive anomaly for that particular ridge and will usually be located along the axis of the source. In a narrow channel deposit, there is a row of peaks that extend outward from the center. These peaks, not including the center one, appear to be the vertices of the ordered ridges as seen in regional aquifers, with the first order ridge's vertex as the first peak, or cluster, from the center, the vertex of the second ordered ridge as the second peak, or cluster, from the center, etc.

Figure 18:
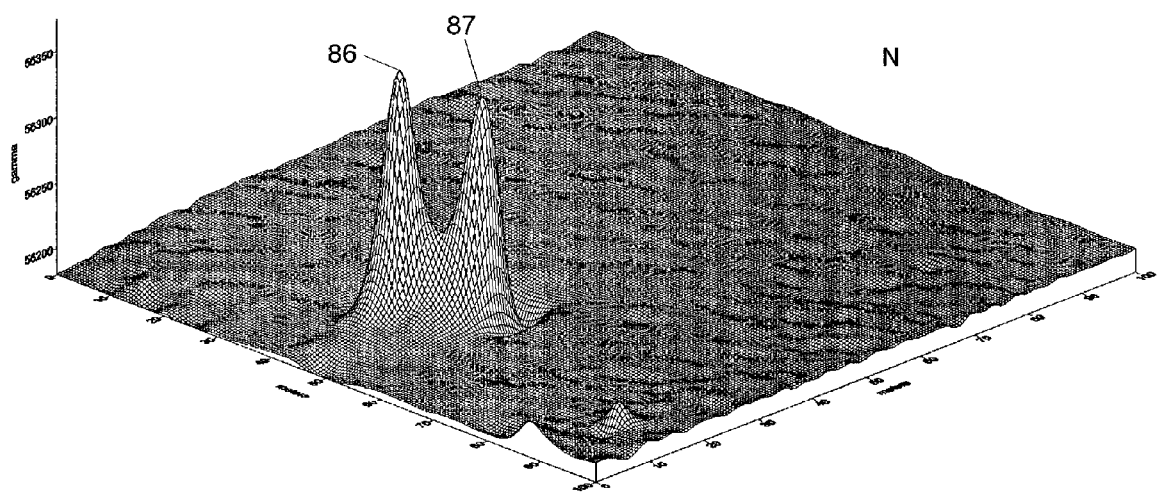
FIG. 18 is a three dimensional map of a magnetic signature associated with a narrow channel where the source is dipping to the southwest.
Figures 18B, 18C:
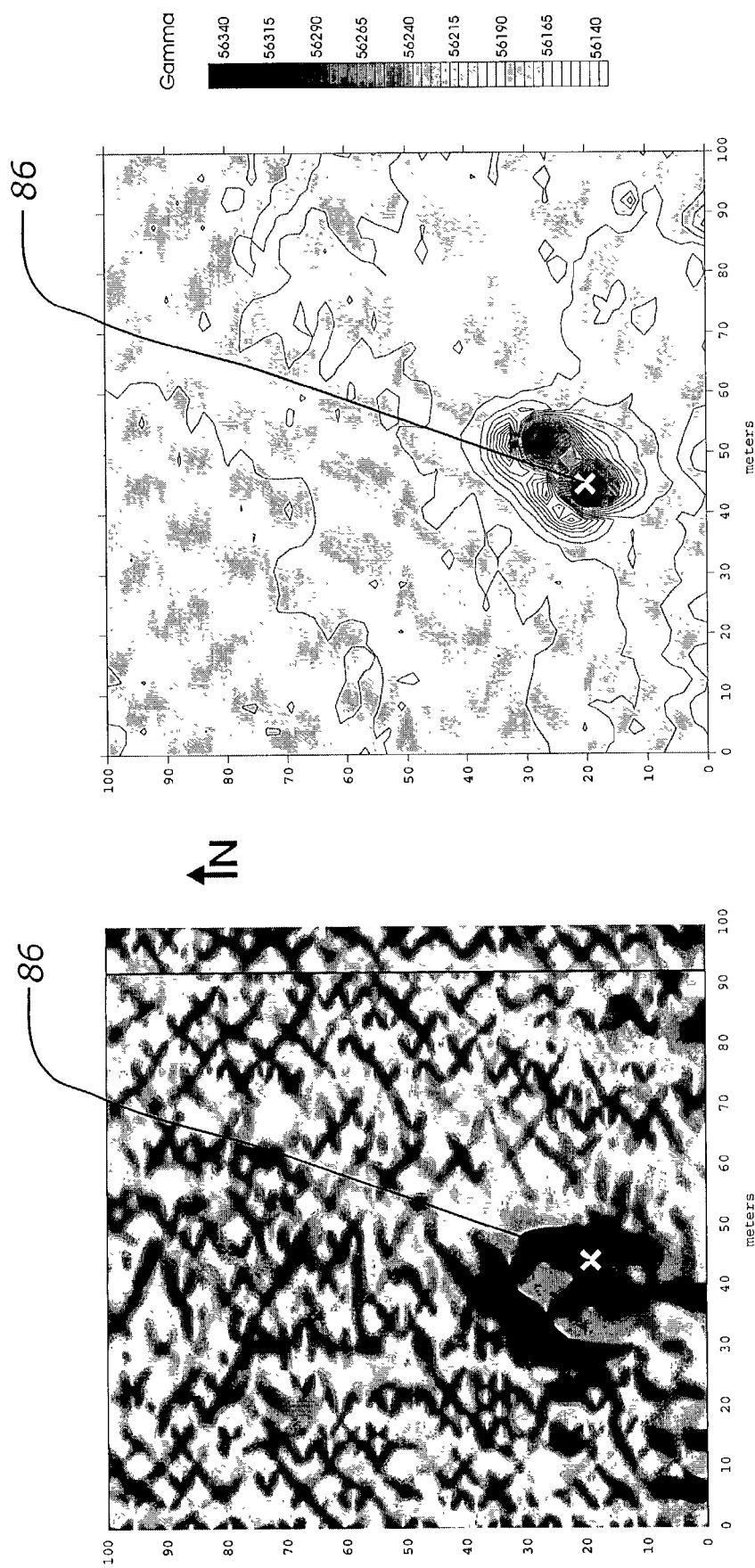
FIG. 18B is a shaded relief map corresponding to FIG. 18.
FIG. 18C is a contour map corresponding to FIG. 18.
Figure 22:
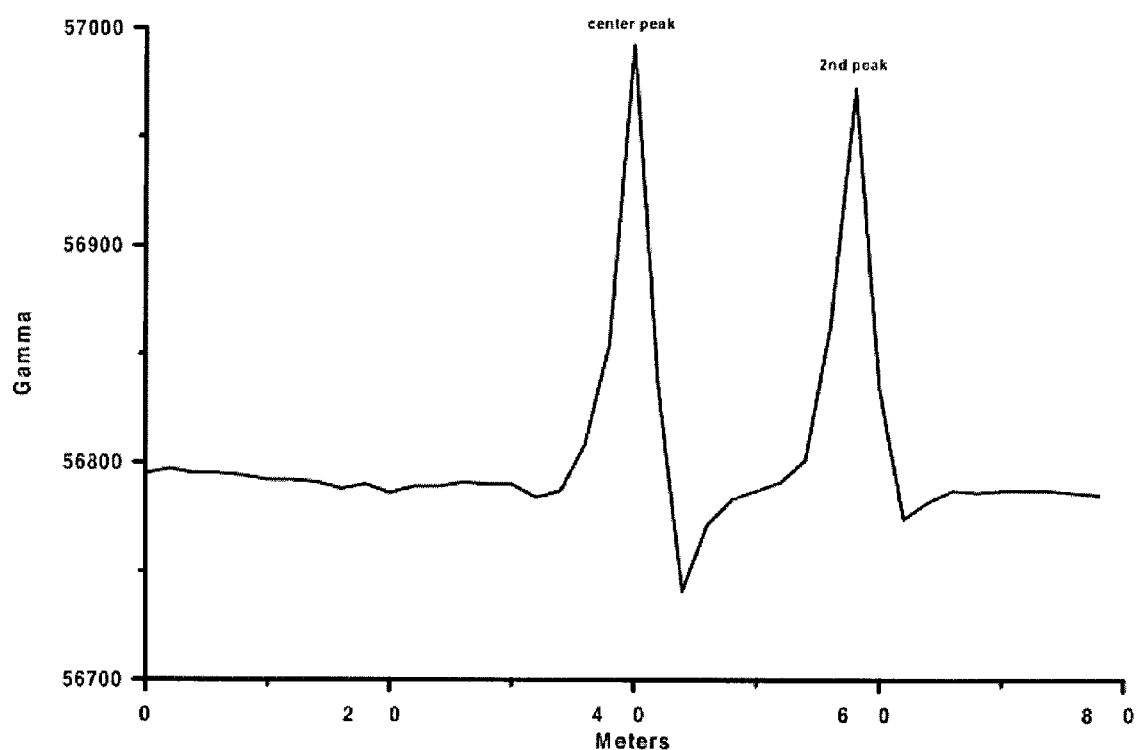
FIG. 22 is a graph showing gamma for a shallow narrow channel's magnetic cross section.
Figure 23:
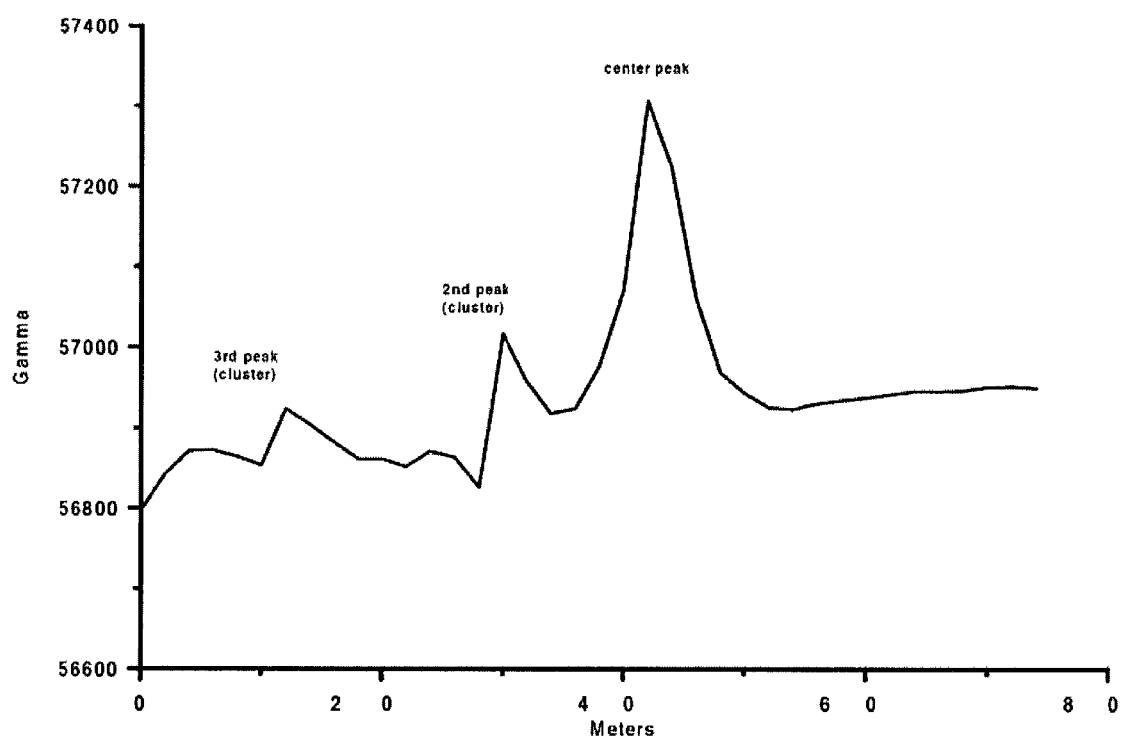
FIG. 23 is a graph showing gamma for a narrow channel's magnetic cross section.
Figure 24:
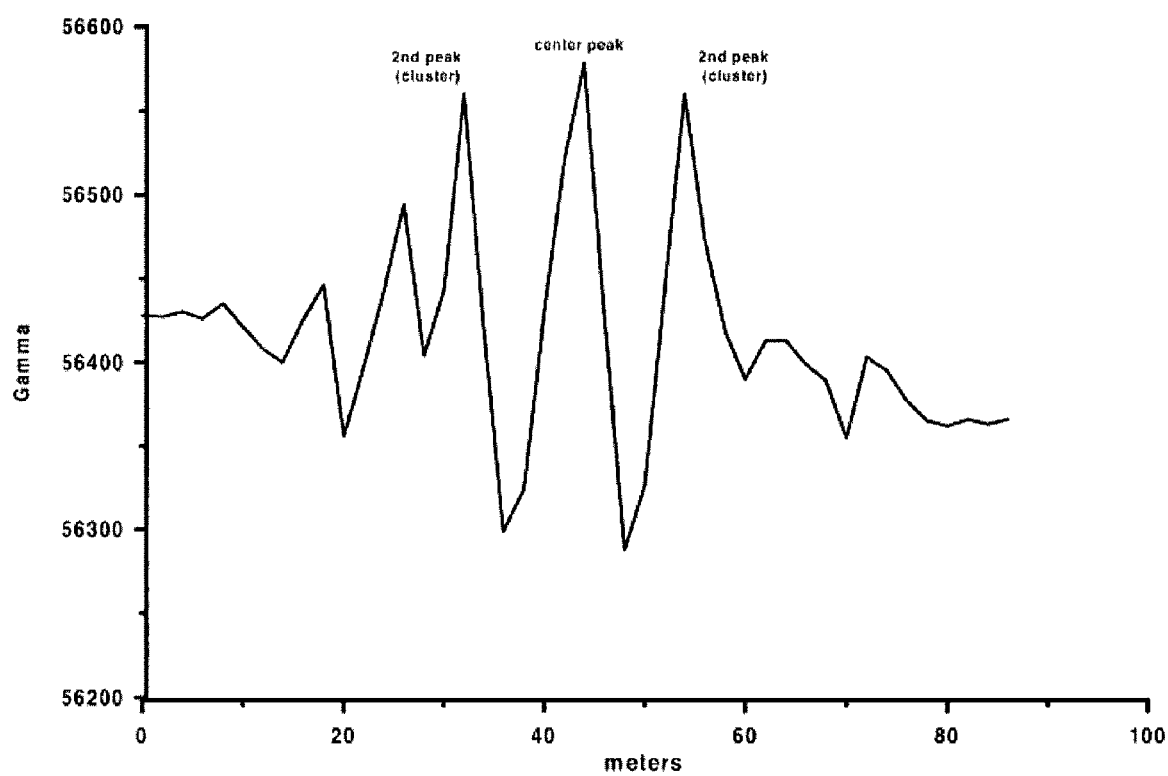
FIG. 24 is another graph showing gamma for a narrow channel's magnetic cross section.
Figure 25:
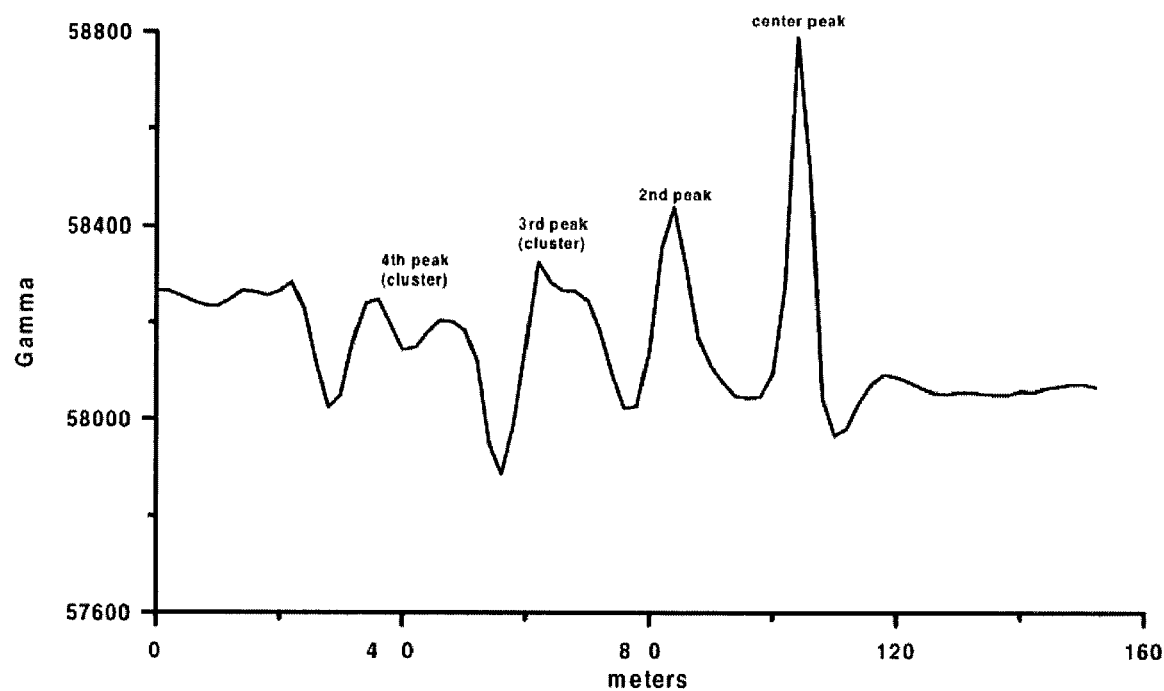
FIG. 25 is another graph showing gamma for a narrow channel's magnetic cross section.
Figure 26:
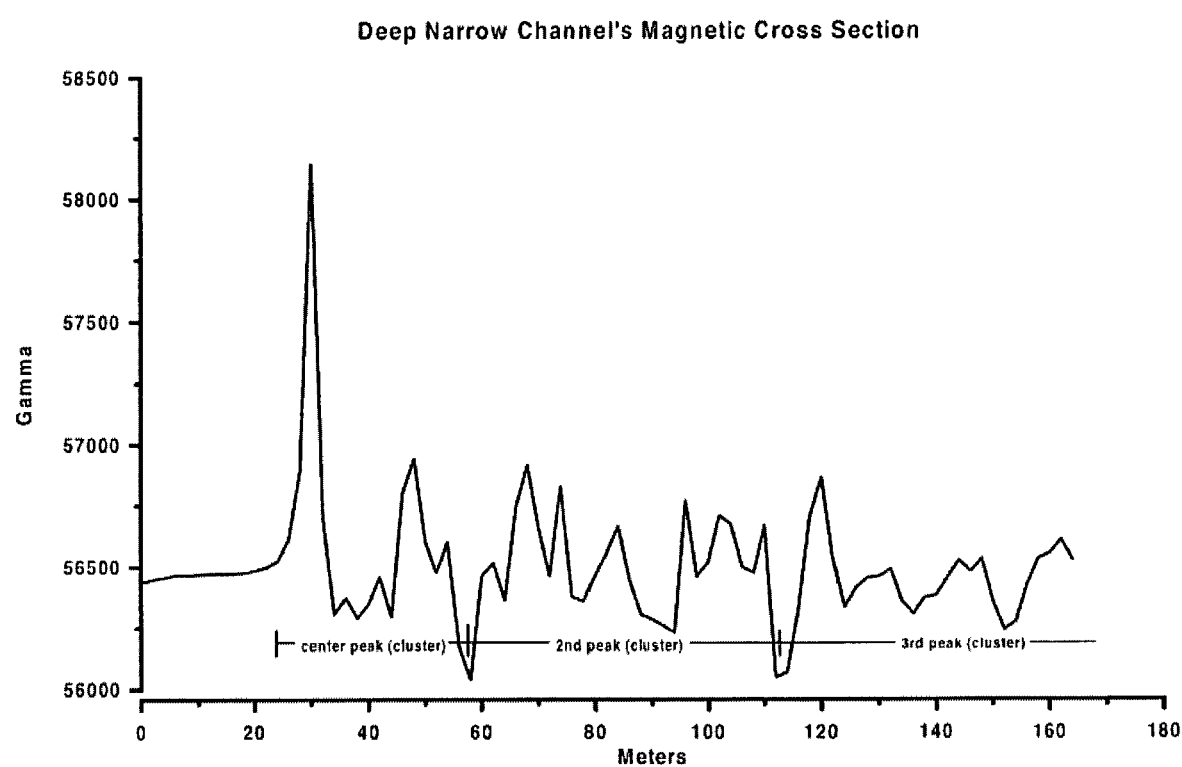
FIG. 26 is a graph showing gamma for a deep narrow channel's magnetic cross section.

Additional information obtainable from the magnetic signatures includes estimates of the aquifer's thickness. Usually in a narrow channel deposit, the thickness of the aquifer can be generalized by analyzing the relationship between the center, or highest peak, and the succeeding peaks that are in the row. The higher the reduction in magnitude from the first to the second peak, or cluster, usually the thinner the source is. If the successive peaks in the row gradually decrease in magnitude as distance increases from the center, then usually the aquifer is much thicker. For example in the cross section represented in FIG. 24, the center peak and the next peak in the row are similar in magnitude but in the cross section in FIG. 23, the difference in magnitude is much more significant. In FIG. 24, the thickness of the aquifer is 41 feet, but in FIG. 23, the thickness is only 6 feet. In addition, other factors may affect the interpretation of the sources' thickness such as the peak characteristics. For example, in FIGS. 18, 18B and 18C, the peaks 86 and 87 are relatively close in magnitude, which indicates a thick sequence, but the peaks are broad and well rounded which is not usually characteristic of a shallow signature. At this site, only 1 foot of sand was encountered at a depth of 100 feet but produced 60 gallons per minute. Although the magnitudes of the peaks were close, the unusual characteristics of the peaks should allow for a change of interpretation. However, if the peaks 86 and 87 in FIG. 18 were characteristic of a shallow aquifer, then the source would have a thick sequence as in FIG. 22.

In a regional aquifer, the positive ridge that surrounds, or partially surrounds the center, depending on the inclination, will exhibit the same type of behavior as in a narrow channel deposit. If the ridge displays a number of peaks that have similar magnitudes as that of the center peak, then the aquifer will tend to be thick as shown in FIG. 12, but if the ridge significantly decreases in magnitude from the center peak, then the source will tend to be much thinner. If the source is tilted close to 90 degrees, then the interpretation of the aquifer's thickness is improbable.

Figure 28:
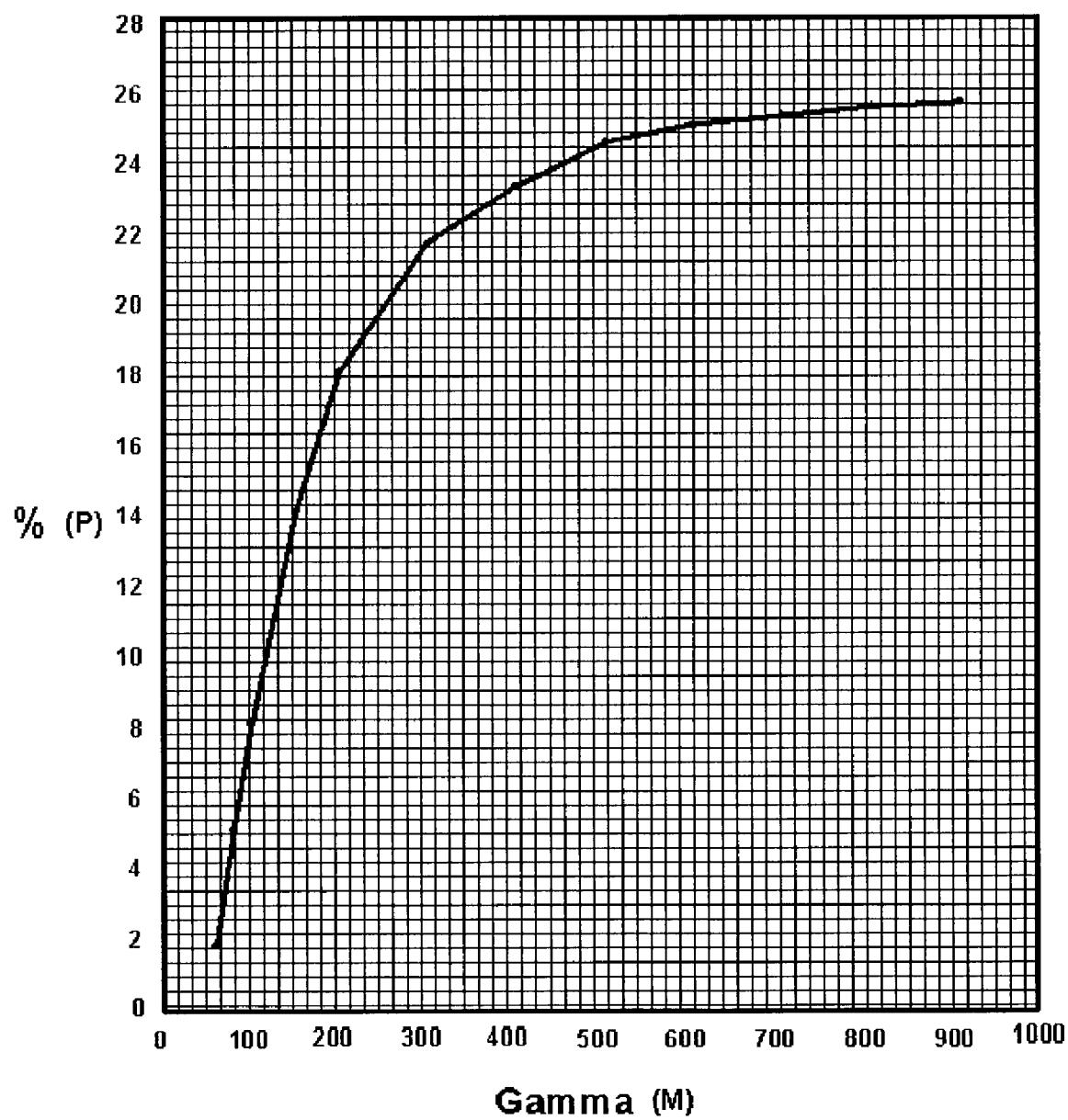
FIG. 28 is a graph showing the anomaly magnitude versus percentage used in determining water flow.

Another characteristic of an aquifer that can be determined from magnetic data is the water flow (F) from the aquifer. Usually the positive anomaly with the highest magnitude will tend to reflect the aquifer's minimal estimate of water production. The higher the magnitude of the anomaly, the higher the water production. FIG. 28 shows a graph of the relationship between the highest positive magnetic anomaly (M), which is represented in gamma, and a percentage (P), (calculated from taking known values of gpm and dividing it by gamma of the highest peak). So by the formula, F=M×P, one can give a general estimate of the minimum water production in a given aquifer. However, if there are multiple peaks with significant positive anomalies, then the estimate of water flow will be considerably more. Therefore, the higher the density of positive anomalies along with a higher magnitude will produce a greater water flow. However, as the source deepens, the density of the peaks will increase, especially in narrow channel deposits, so it best to determine a general estimate of the depth to the aquifer prior to the estimating water flow. In FIG. 12, the main peak is only 293 gamma above the natural magnetic field but with a high density of peaks, the water flow increases significantly. Estimating minimal water flow, derived from the magnetic magnitude, is best used when an aquifer is horizontal, or nearly horizontal, in a narrow channel or regional environment.

Thus by looking at the characteristics of the magnetic anomalies that emanate from aquifers, the present invention provides for determining characteristics of the aquifers.

The present invention also provides for placing a well or determining a drilling location based on the magnetic anomalies.

After a magnetic map is generated, a specific coordinate, or location, can be assigned for drilling to take place. The interpretation of the magnetic map is of the utmost importance with respect to placement of the water well.

Figure 21:
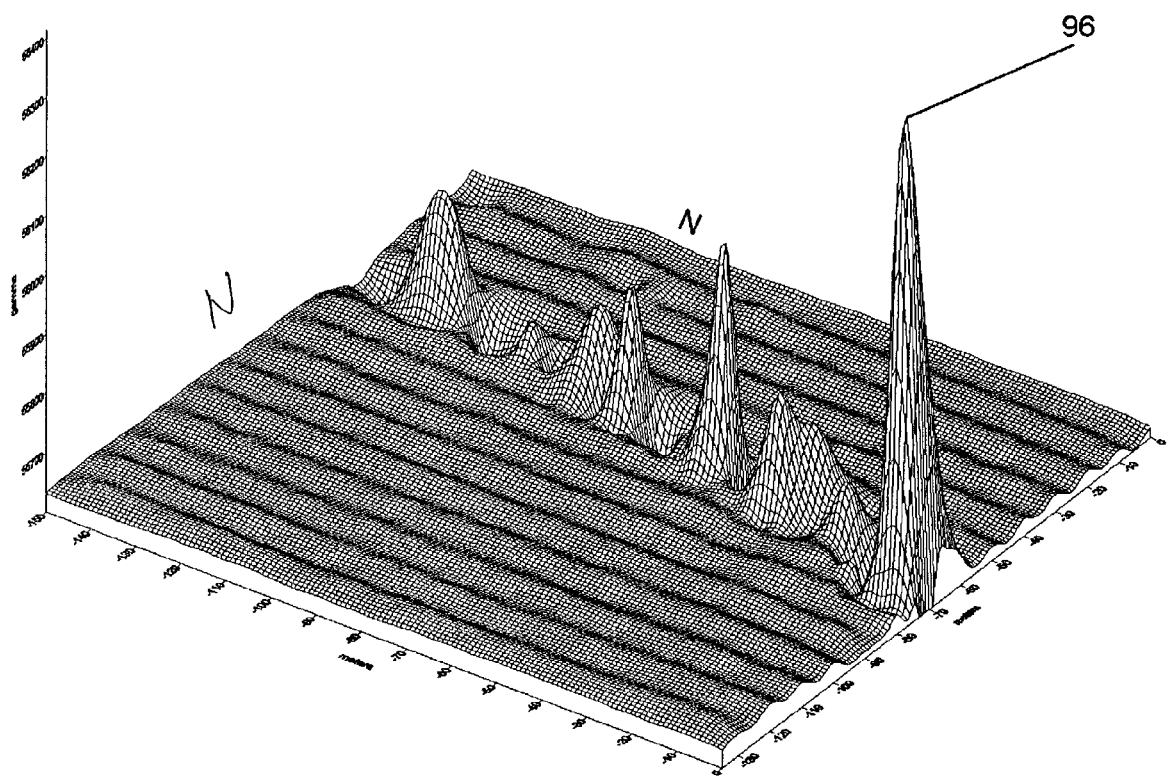
FIG. 21 is a three dimensional map of a magnetic signature associated with a narrow channel where the source is dipping to the east and southeast.
Figure 21C:
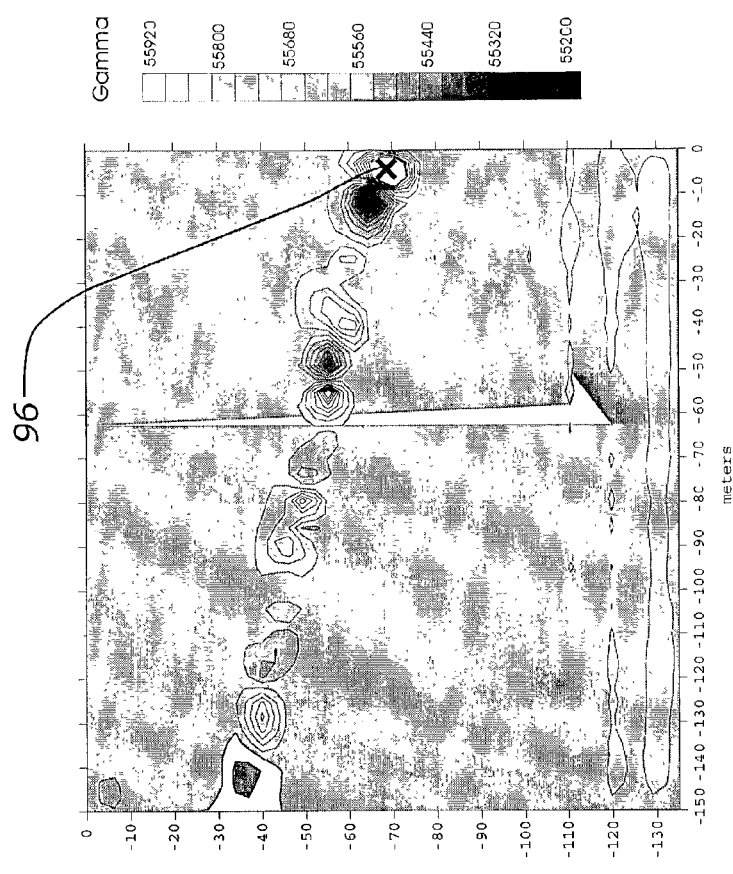
FIG. 21C is a contour map corresponding to FIG. 21.
Figure 21B:
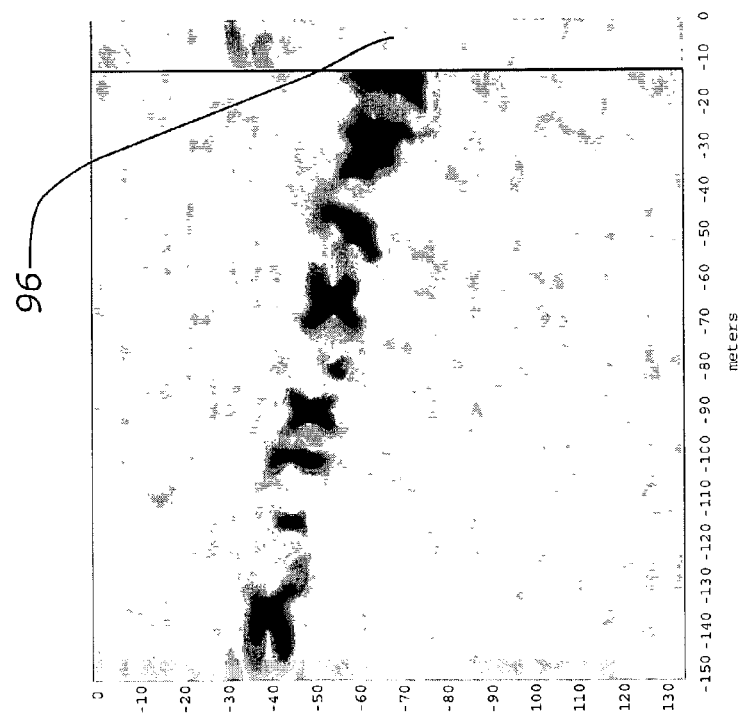
FIG. 21B is a shaded relief map corresponding to FIG. 21.

In narrow buried channel deposits, tens of feet can make a difference between a dry hole and a water well. Coordinates for drilling on a narrow buried channel should be placed on the highest peak. Thus, in FIGS. 6, 7, 8, and 21, drilling should preferably take place at the highest peaks. For example, at center peak 96 in FIG. 21. However, if the source is tilted close to 90 degrees so a ridge appears that separates a regional magnetic high and low, then drilling should take place on the ridge or slightly toward the side of the ridge where the regional magnetic low is located. If the magnitude of the natural field can be determined for that area, then drilling should take place on the low side of the ridge at that particular magnetic magnitude as shown in FIG. 9.

In a wide channel deposit, drilling should be placed in the area of magnetic low that is usually surrounded by a positive, ridge-like, anomaly. The center can be different shapes depending on the shape of the source but usually is in the shape of a bowl or crescent shape. There may be several bowl shaped areas between the two parallel positive ridges, so picking the right one is critical. Usually the bowl that is in the center of the source, is the one that is most circular in shape with a distinct ridge that defines the parameter of the bowl. As distance increases from the center, the bowl shaped areas tend to elongate and become less defined. This is shown in FIG. 10.

As discussed earlier, the magnetic signature can vary significantly as the source tilts from 0 to 90 degrees. Drilling on a regional aquifer is usually located on the largest positive anomaly but if the source is large and tilted to a higher degree then one edge, or part of the ridge surrounding the center, will form a row of higher magnetic activity with the magnitude subsiding as the ridge changes direction. In this case, drilling should be done inside the ridge, or row of peaks, on a less pronounced positive anomaly as demonstrated in FIG. 16. In FIG. 16, the peaks with the highest magnitude are at the corners of the source instead of the center.

Drilling should always be done in the center of the aquifer but if topography, property ownership, or a variety of other reasons, would prevent drilling in the optimum location, then information as to the distance from the center, that drilling could be done and still encounter the aquifer, could be crucial. The distance from the center, in which drilling can take place normal to a narrow channel's axis is very small where tens of feet can make a significant difference. However down the narrow channel's axis, drilling can be done at greater distances. If the narrow channel is tilted close to 90 degrees, then drilling can be done anywhere along the ridge. However, it is advised to drill on the part of the ridge with the greatest difference between the magnetic high and low.

In a wide channel deposit, the same applies to that of a narrow channel except distances normal from the center can be increased. Usually, if drilling takes place, normal to the center and in between the two positive parallel ridges, then the aquifer should be encountered. However, if the source is tilted to approximately 90 degrees then drilling should take place on the plateau between the regional magnetic high and low.

Figure 19:
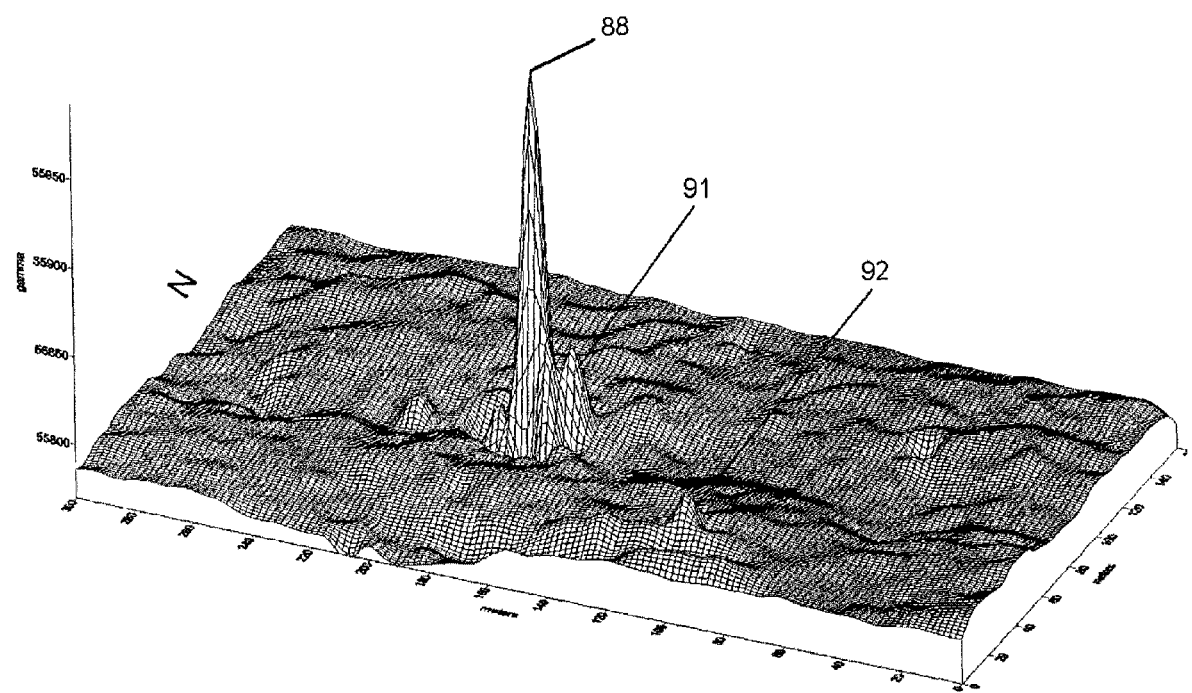
FIG. 19 is a three dimensional map of a magnetic signature associated with a regional aquifer with a horizontal source.
Figure 19C:
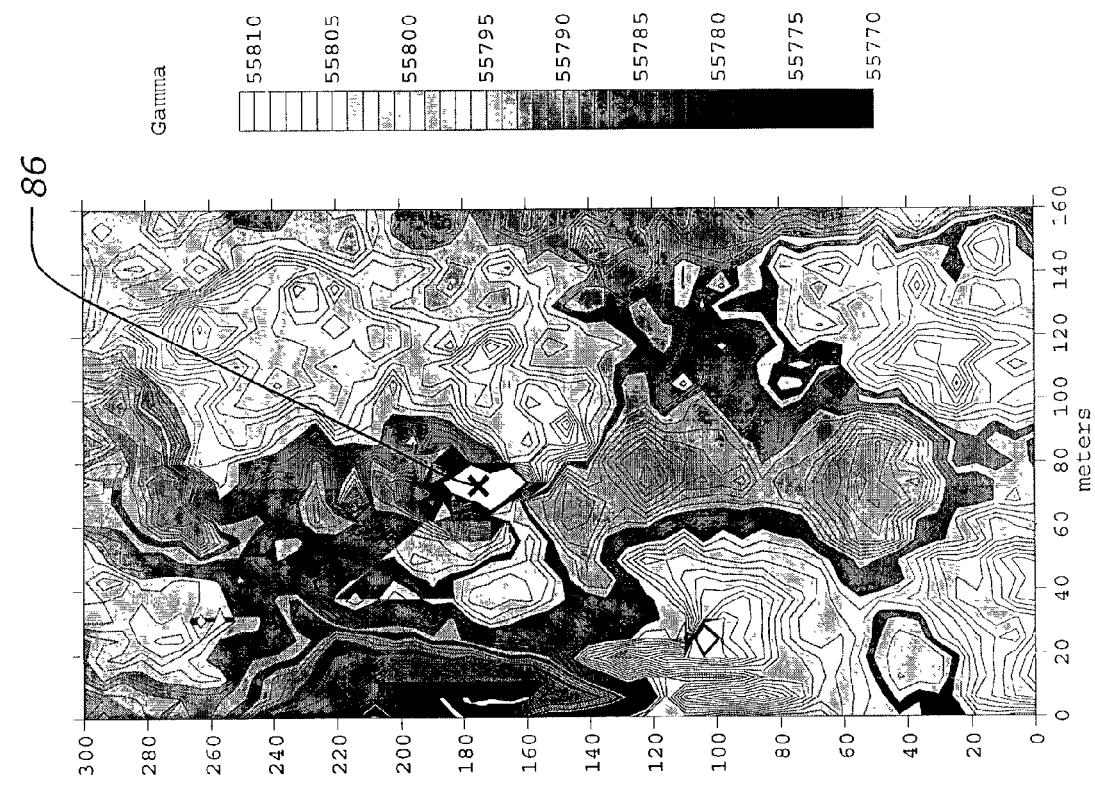
FIG. 19C is a contour map corresponding to FIG. 19.
Figure 19B:
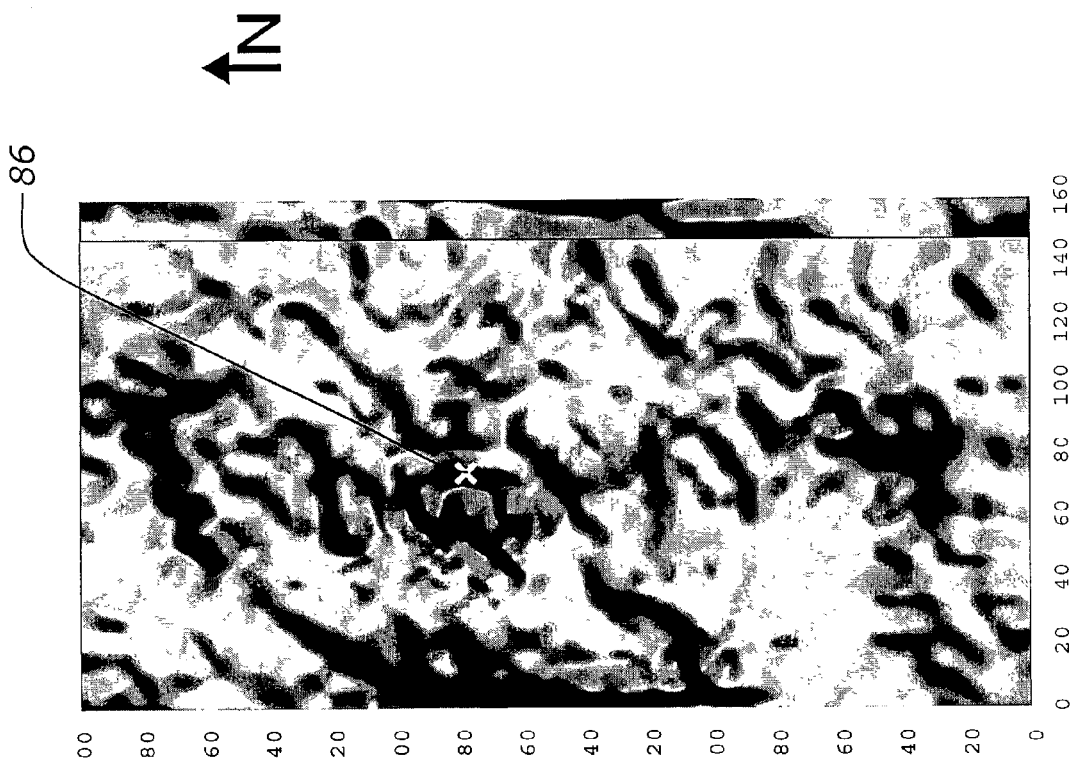
FIG. 19B is a shaded relief map corresponding to FIG. 19.

In a regional aquifer, the length/width ratio is about the same so distances, that drilling can take place from the center, are relatively equal. Usually in a relatively shallow regional aquifer it is recommended that drilling does not take place outside of the second order concentric ridge from the center. In FIGS. 19, 19B and 19C, a large diameter water well, which was dry bored and placed approximately 120 meters from the center 88 or about 60 meters outside of the second order ridge 92, missed the aquifer at 90 feet and went to a completed depth of 130 feet where no water was found. Only after the borehole was allowed to set open for hours, with no water in it, the aquifer at 90 feet blew into the borehole from the side. However, if the aquifer, which pumped over 100 gallons per minute, did not yield as much water or the borehole was drilled with fluids then this location would have been a dry hole.

As the regional aquifer becomes deeper, it is advisable to drill inside the parameters of the first order ridge because as the magnetic source deepens the concentric ridges will become larger in diameter resulting in a greater distance from the center.

Figure 27:
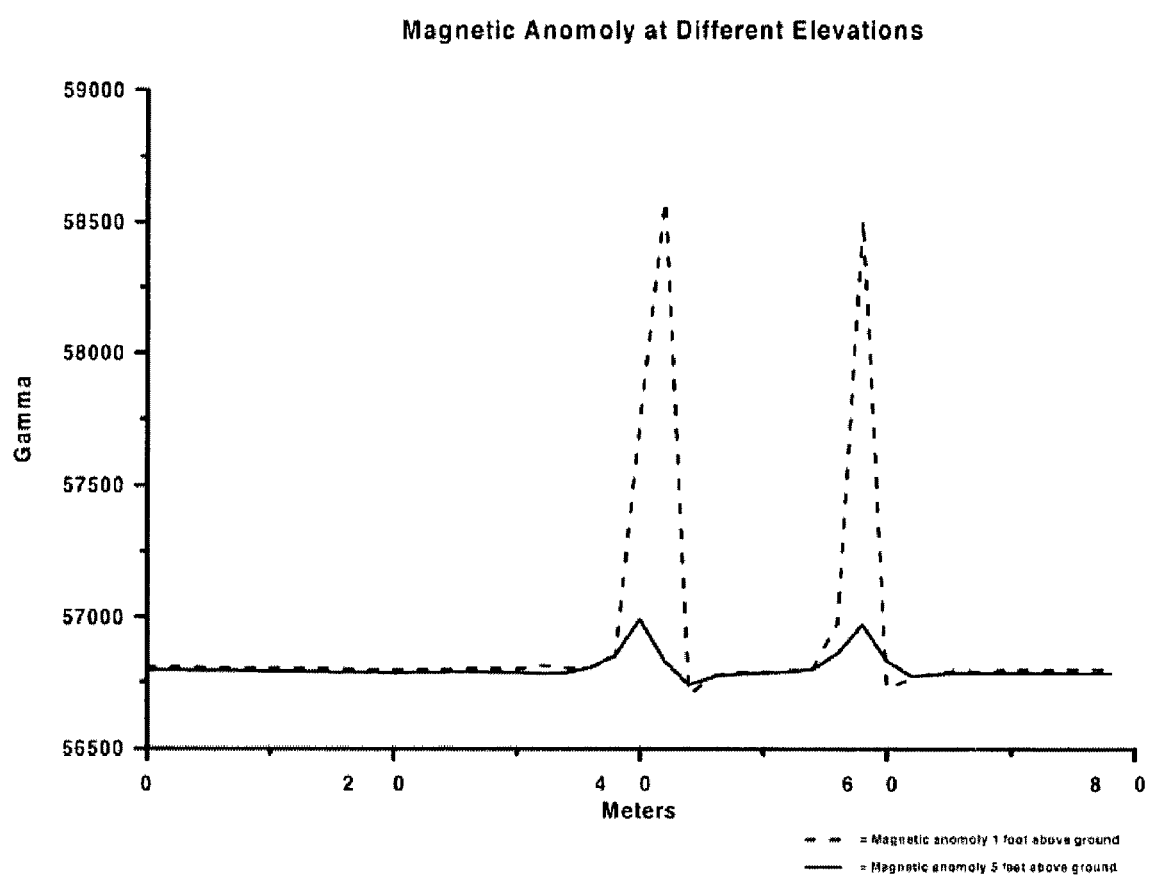
FIG. 27 is a graph showing the gamma associated with a magnetic anomaly at varying elevations.

When working with magnetic anomalies, it is best to know that the magnitude and sometimes the anomaly density changes as the elevation changes from the surface of the ground. A comparison between a magnetic anomaly at 1 foot and 5 feet above the ground is represented in a cross-section in FIG. 27. The magnetic anomaly, at the peaks, has a much greater magnitude at 1 foot than at 5 foot but in an area where there is little magnetic activity the magnetic magnitude, at 1 foot and 5 feet are very close. Also, as the readings are taken closer to the surface, the anomaly density increases where at 5 feet there may only be one peak compared to two or more peaks, at the same location, with the sensor at 1 foot elevation.

Magnetic signatures are found in man-made objects as well as in other natural phenomena. Therefore, when mapping areas for locating water supplies, it is best to know if any man-made objects are buried in the area. As in FIG. 9, it was not known that a buried cement tank was in the area until it was mapped for a buried channel deposit. In this instance, the man-made anomaly did not result in the misinterpretation of the data but in some narrow channel or regional environments, the peak would have caused an interpretation problem. FIGS. 20, 20B and 20C also indicate the presence of a buried fence 94. FIGS. 6A, 6B and 6C include a buried man made object 54.

There are also natural irregularities, in the natural magnetic field, that are beneficial to know before surveying. The topography can influence the accumulation of magnetic and iron-bearing minerals by water consistently flowing over the same areas. This would be the case in dips in the topography such as small valleys and other similar formations. These magnetic anomalies can also reflect the topography's characteristics as well. This must be taken into account when locating and interpreting magnetic data, or what appears to be a promising site to drill may just be anomalies created by surface phenomena.

Magnetic anomalies that have been detected from the surface can emanate from sources miles deep within the earth. Until now, these anomalies have been suggested to come from deep-seated solid, or plastic-like, iron rich masses. With this new information, of magnetic anomalies emanating from common geological formations, new possibilities could arise in the exploration of other natural resources. Oil, which is found in sandstones, or porous media, may also allow magnetic grains to align with the natural magnetic field and generate it's own magnetic signature.

Thus, a method for determining underground fluid sources has been disclosed. The present invention contemplates variations in the manner in which the magnetic data is collected, interpreted, and other variations.

What is claimed is:

1. A method for finding and evaluating a natural underground fluid source, comprising:
   measuring magnetic signatures associated with at least one magnetic anomaly by measuring a magnetic field at a plurality of locations;
   interpreting the magnetic signatures to determine that the magnetic signatures are magnetic signatures of a natural underground fluid source based on the magnetic field at the plurality of locations;
   determining at least one characteristic of the natural underground fluid source from the magnetic signatures, based on the shape, area, magnitude, and density of the magnetic signatures; and
   wherein the at least one characteristic includes a fluid production estimate of the natural underground fluid source.

2. The method of claim 1 wherein the at least one characteristic of the underground fluid source includes a tilt of the natural underground fluid source.

3. The method of claim 1 wherein the fluid source is a water source.

4. The method of claim 3 wherein the fluid source is selected from the set comprising a narrow buried channel, a wide channel deposit, and a regional aquifer.

5. A method for finding and analyzing a natural underground fluid source, comprising:
   determining a presence of magnetic anomalies in au area;
   measuring magnetic signatures associated with the magnetic anomalies by measuring a magnetic field at a plurality of locations;
   interpreting the magnetic signatures to determine that the magnetic signatures are magnetic signatures of the natural underground fluid source;
   determining a location within the area for drilling to provide access to the natural underground fluid source; and
   determining at least one characteristic of the natural underground fluid source a fluid production estimate of the natural underground fluid source.

6. The method of claim 5 wherein the step of interpreting includes mapping the magnetic signature measurements within the area to produce a map and relating characteristics of the map to characteristics of the underground fluid source.

7. The method of claim 6 wherein the step of relating includes relating characteristics of the map to at least one of the set of fluid sources comprising a narrow buried channel, a wide channel deposit, and a regional aquifer.

8. The method of claim 5 wherein the underground fluid source is water.

9. The method of claim 5 wherein the location is associated with a center peak of the map of the magnetic signatures.

10. The method of claim 5 wherein the location is associated with a ridge of the map of the magnetic signatures.

11. The method of claim 5 wherein the location is associated with a bowl shaped area of the map of the magnetic signatures.

12. The method of claim 5 further comprising drilling at the location.

13. The method of claim 5 wherein the step of determining the presence of magnetic anomalies in the area includes providing a trailer having a pair of rods wrapped in wire electrically connected to a voltmeter for determining the presence of magnetic anomalies.

14. A method for finding and evaluating a natural underground fluid source, comprising:
   measuring magnetic signatures of magnetic anomalies within an area using a magnetometer, by measuring a magnetic field at a plurality of locations;
   mapping the magnetic signatures to illustrate location of the natural underground fluid source;
   determining a fluid production estimate of the natural underground fluid source;
   selecting a point to drill based on physical characteristics of the natural underground fluid source determined from the magnetic signatures.

* * * * *

UNITED STATES PATENT AND TRADEMARK OFFICE
CERTIFICATE OF CORRECTION

PATENT NO. : 6,977,505 B1
DATED : December 20, 2005
INVENTOR(S) : Rosenquist, Lanny It is certified that error appears in the above-identified patent and that said Letters Patent is hereby corrected as shown below:

Column 14,
Line 6, after "anomalies in" delete "au" add -- an --.

Signed and Sealed this

Seventh Day of March, 2006

JON W. DUDAS
*Director of the United States Patent and Trademark Office*